US007066973B1

(12) United States Patent
Bentley et al.

(10) Patent No.: US 7,066,973 B1
(45) Date of Patent: *Jun. 27, 2006

(54) INTEGRATED REFORMER AND SHIFT REACTOR

(75) Inventors: Jeffrey M. Bentley, Westford, MA (US); Lawrence G. Clawson, Dover, MA (US); William L. Mitchell, Belmont, MA (US); Matthew H. Dorson, Arlington, MA (US)

(73) Assignee: Nuvera Fuel Cells, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/562,787

(22) Filed: May 2, 2000

Related U.S. Application Data

(63) Continuation-in-part of application No. 09/006,727, filed on Jan. 14, 1998, now Pat. No. 6,245,303, and a continuation-in-part of application No. 08/703,398, filed on Aug. 26, 1996, now Pat. No. 6,126,908.

(60) Provisional application No. 60/132,259, filed on May 3, 1999, provisional application No. 60/132,184, filed on May 3, 1999.

(51) Int. Cl.
*B01J 8/02* (2006.01)
*B01J 8/04* (2006.01)

(52) U.S. Cl. .................. 48/197 R; 48/61; 48/62 R; 48/94; 48/197 R; 422/188; 422/190; 422/191; 422/192; 422/193; 422/198; 422/200; 422/211

(58) Field of Classification Search .............. 48/61, 48/62 R, 75, 63, 64, 89, 94, 214 R, 120, 48/127.9, 128, 197 R, 198.1, 211, 198.3, 48/212, 198.6, 95, 198.7, 119, 215, 214 A; 422/188–195, 198, 200, 201, 211, 648.1, 422/650–656
See application file for complete search history.

(56) References Cited

U.S. PATENT DOCUMENTS

| 1,366,176 A | 1/1921 | Harger et al. |
| 1,375,932 A | 4/1921 | Rideal et al. |
| 1,797,426 A | 3/1931 | Larson |
| 2,051,363 A | 8/1936 | Beckley |
| 2,220,849 A | 11/1940 | Riblett |
| 2,759,805 A | 8/1956 | Erickson et al. |

(Continued)

FOREIGN PATENT DOCUMENTS

EP          0 312 757          4/1989

(Continued)

*Primary Examiner*—Alexa D. Neckel
(74) *Attorney, Agent, or Firm*—Fish & Richardson P.C.

(57) ABSTRACT

A hydrocarbon fuel reformer for producing diatomic hydrogen gas is disclosed. The reformer includes a first reaction vessel, a shift reactor vessel annularly disposed about the first reaction vessel, including a first shift reactor zone, and a first helical tube disposed within the first shift reactor zone having an inlet end communicating with a water supply source. The water supply source is preferably adapted to supply liquid-phase water to the first helical tube at flow conditions sufficient to ensure discharge of liquid-phase and steam-phase water from an outlet end of the first helical tube. The reformer may further include a first catalyst bed disposed in the first shift reactor zone, having a low-temperature shift catalyst in contact with the first helical tube. The catalyst bed includes a plurality of coil sections disposed in coaxial relation to other coil sections and to the central longitudinal axis of the reformer, each coil section extending between the first and second ends, and each coil section being in direct fluid communication with at least one other coil section.

48 Claims, 18 Drawing Sheets

U.S. PATENT DOCUMENTS

| | | |
|---|---|---|
| 2,795,559 A | 6/1957 | Whaley |
| 3,014,787 A | 12/1961 | Peet |
| 3,159,450 A | 12/1964 | Asker et al. |
| 3,180,813 A | 4/1965 | Wasp et al. |
| 3,216,782 A | 11/1965 | Cohn |
| 3,216,783 A | 11/1965 | Cohn |
| 3,278,452 A | 10/1966 | Vorum |
| 3,288,646 A | 11/1966 | Söredal |
| 3,334,971 A | 8/1967 | James et al. |
| 3,367,882 A | 2/1968 | Marshall, Jr. |
| 3,375,140 A | 3/1968 | Oswin |
| 3,395,004 A | 7/1968 | Taylor et al. |
| 3,397,028 A | 8/1968 | Brauer |
| 3,446,672 A | 5/1969 | Giner |
| 3,446,674 A | 5/1969 | Giner |
| 3,451,949 A | 6/1969 | Topsoe et al. |
| 3,462,308 A | 8/1969 | Winters |
| 3,499,797 A | 3/1970 | Hooper |
| 3,516,807 A | 6/1970 | West et al. |
| 3,524,720 A | 8/1970 | Bauer |
| 3,531,263 A | 9/1970 | Sederquist |
| 3,541,729 A | 11/1970 | Dantowitz |
| 3,607,419 A | 9/1971 | Keating, Jr. |
| 3,615,850 A | 10/1971 | Chludzinski et al. |
| 3,619,144 A | 11/1971 | Bawa et al. |
| 3,645,701 A | 2/1972 | Banchik et al. |
| 3,649,360 A | 3/1972 | Bloomfield et al. |
| 3,657,064 A * | 4/1972 | Shick .................. 162/30.1 |
| 3,666,423 A | 5/1972 | Muenger |
| 3,666,682 A | 5/1972 | Muenger |
| 3,669,751 A | 6/1972 | Richman |
| 3,718,506 A | 2/1973 | Fischer et al. |
| 3,729,898 A | 5/1973 | Richardson |
| 3,787,038 A | 1/1974 | Tesner et al. |
| 3,796,547 A | 3/1974 | Muenger |
| 3,804,578 A * | 4/1974 | Robbins .................. 431/158 |
| 3,909,299 A | 9/1975 | Corrigan |
| 3,920,416 A | 11/1975 | Houseman |
| 3,932,147 A | 1/1976 | Okagami et al. |
| 3,941,869 A | 3/1976 | Fuchs |
| 3,955,941 A | 5/1976 | Houseman et al. |
| 3,961,018 A | 6/1976 | Williamson |
| 3,971,847 A | 7/1976 | Houseman |
| 3,982,910 A | 9/1976 | Houseman et al. |
| 4,006,099 A | 2/1977 | Marion et al. |
| 4,006,100 A | 2/1977 | Crouch |
| 4,007,017 A | 2/1977 | Slater et al. |
| 4,007,018 A | 2/1977 | Slater et al. |
| 4,007,019 A | 2/1977 | Slater et al. |
| 4,008,050 A | 2/1977 | Betz |
| 4,010,797 A | 3/1977 | Parnkopf et al. |
| 4,025,612 A | 5/1977 | Barber |
| 4,042,344 A | 8/1977 | Callcott et al. |
| 4,045,960 A | 9/1977 | Cornelius et al. |
| 4,056,602 A | 11/1977 | Matovich |
| 4,059,076 A | 11/1977 | Kosaka et al. |
| 4,060,397 A | 11/1977 | Buiter et al. |
| 4,060,498 A | 11/1977 | Kawagoshi et al. |
| 4,066,543 A | 1/1978 | McCoy |
| 4,067,958 A | 1/1978 | Gorin |
| 4,071,330 A | 1/1978 | Sederquist |
| 4,072,601 A | 2/1978 | Patouillet |
| 4,073,698 A | 2/1978 | Blurton et al. |
| 4,074,981 A | 2/1978 | Slater |
| 4,083,799 A | 4/1978 | Estes et al. |
| 4,087,259 A | 5/1978 | Fujitani et al. |
| 4,088,450 A | 5/1978 | Kosaka et al. |
| 4,094,813 A | 6/1978 | Van Lookeren Campagne |
| 4,098,587 A | 7/1978 | Krar et al. |
| 4,098,588 A | 7/1978 | Buswell et al. |
| 4,098,589 A | 7/1978 | Buswell et al. |
| 4,099,383 A | 7/1978 | Paull et al. |
| 4,101,376 A | 7/1978 | Cornelius et al. |
| 4,113,441 A | 9/1978 | Suzuki et al. |
| 4,113,445 A | 9/1978 | Gettert et al. |
| 4,121,912 A | 10/1978 | Barber et al. |
| 4,125,090 A | 11/1978 | Masunaga et al. |
| 4,140,493 A | 2/1979 | Johnson et al. |
| 4,145,405 A | 3/1979 | Gorin |
| 4,153,671 A | 5/1979 | Clements et al. |
| 4,155,987 A | 5/1979 | Peterman et al. |
| 4,162,290 A | 7/1979 | Crawford et al. |
| 4,178,758 A | 12/1979 | Paull et al. |
| 4,181,503 A | 1/1980 | Lesieur et al. |
| 4,182,795 A | 1/1980 | Baker et al. |
| 4,183,369 A | 1/1980 | Thomas |
| 4,184,322 A | 1/1980 | Paull et al. |
| 4,191,540 A | 3/1980 | Mitchell et al. |
| 4,199,545 A | 4/1980 | Matovich |
| 4,203,950 A | 5/1980 | Sederquist |
| 4,205,044 A | 5/1980 | Gramatica |
| 4,216,198 A | 8/1980 | Simons |
| 4,224,298 A | 9/1980 | Robinson |
| 4,229,418 A | 10/1980 | Wijffels et al. |
| 4,233,179 A | 11/1980 | Russ et al. |
| 4,233,180 A | 11/1980 | Hausberger et al. |
| 4,233,276 A | 11/1980 | D'Souza et al. |
| 4,236,899 A * | 12/1980 | Gulden et al. .................. 48/89 |
| 4,236,941 A | 12/1980 | Main, Jr. |
| 4,240,805 A | 12/1980 | Sederquist |
| 4,242,105 A | 12/1980 | Frost |
| 4,246,235 A | 1/1981 | Rogers |
| 4,259,294 A | 3/1981 | Van Zijll Langhout et al. |
| 4,259,312 A | 3/1981 | Flockenhaus et al. |
| 4,259,414 A | 3/1981 | Williams |
| 4,261,964 A | 4/1981 | Scott, IV et al. |
| 4,277,444 A | 7/1981 | Van Landeghem |
| 4,292,274 A | 9/1981 | Faitani et al. |
| 4,293,315 A | 10/1981 | Sederquist |
| 4,328,008 A | 5/1982 | Muenger et al. |
| 4,328,856 A | 5/1982 | Cunningham |
| 4,337,170 A | 6/1982 | Fuderer |
| 4,338,292 A | 7/1982 | Duranleau |
| 4,341,737 A | 7/1982 | Albano et al. |
| 4,343,624 A | 8/1982 | Belke et al. |
| 4,355,003 A | 10/1982 | Grobel |
| 4,365,006 A | 12/1982 | Baker |
| 4,371,379 A | 2/1983 | Brent et al. |
| 4,372,920 A | 2/1983 | Zardi |
| 4,381,187 A | 4/1983 | Sederquist |
| 4,391,617 A | 7/1983 | Way |
| 4,391,794 A | 7/1983 | Silberring |
| 4,392,869 A | 7/1983 | Marion et al. |
| 4,402,711 A | 9/1983 | Stellaccio |
| 4,405,562 A | 9/1983 | Zardi et al. |
| 4,405,593 A | 9/1983 | Schlauer et al. |
| 4,420,462 A | 12/1983 | Clyde |
| 4,430,096 A | 2/1984 | Schnur et al. |
| 4,436,711 A | 3/1984 | Olson |
| 4,442,020 A | 4/1984 | Fuderer |
| 4,454,207 A | 6/1984 | Fraioli et al. |
| 4,462,928 A | 7/1984 | Dille et al. |
| 4,464,444 A | 8/1984 | Mikawa |
| 4,478,793 A | 10/1984 | Vickers |
| 4,491,456 A | 1/1985 | Schlinger |
| 4,504,447 A | 3/1985 | Spurrier et al. |
| 4,505,232 A | 3/1985 | Usami et al. |
| 4,522,894 A | 6/1985 | Hwang et al. |
| 4,530,886 A | 7/1985 | Sederquist |
| 4,532,192 A | 7/1985 | Baker et al. |
| 4,553,981 A | 11/1985 | Fuderer |
| 4,563,267 A | 1/1986 | Graham et al. |
| 4,569,890 A | 2/1986 | Barthel |
| 4,578,370 A | 3/1986 | Greenwood |

| | | | | | |
|---|---|---|---|---|---|
| 4,581,157 A | 4/1986 | Twigg | 4,865,926 A | 9/1989 | Levy et al. |
| 4,590,044 A | 5/1986 | Mos et al. | 4,869,894 A | 9/1989 | Wang et al. |
| 4,604,275 A | 8/1986 | Murib | 4,876,163 A | 10/1989 | Reichner |
| 4,618,451 A | 10/1986 | Gent | 4,877,592 A | 10/1989 | Matros et al. |
| 4,626,521 A | 12/1986 | Murib | 4,879,189 A | 11/1989 | Snopkowski |
| 4,636,371 A | 1/1987 | Farha, Jr. | 4,888,031 A | 12/1989 | Martens |
| 4,642,042 A | 2/1987 | Smith | 4,888,130 A | 12/1989 | Banquy |
| 4,642,272 A | 2/1987 | Sederquist | 4,892,717 A | 1/1990 | Hass |
| 4,650,651 A | 3/1987 | Fuderer | 4,897,089 A | 1/1990 | Quang et al. |
| 4,657,828 A | 4/1987 | Tajima | 4,897,253 A | 1/1990 | Jenkins |
| 4,659,634 A | 4/1987 | Struthers | 4,902,586 A | 2/1990 | Wertheim |
| 4,666,680 A | 5/1987 | Lewis | 4,904,455 A | 2/1990 | Karafian et al. |
| 4,670,357 A | 6/1987 | Taylor | 4,909,808 A | 3/1990 | Voecks |
| 4,670,359 A | 6/1987 | Beshty et al. | 4,909,809 A | 3/1990 | Ohsaki et al. |
| 4,678,600 A | 7/1987 | Stahl et al. | 4,910,099 A | 3/1990 | Gottesfeld |
| 4,678,723 A | 7/1987 | Wertheim | 4,919,844 A | 4/1990 | Wang |
| 4,681,701 A | 7/1987 | Sie | 4,921,680 A | 5/1990 | Bonk et al. |
| 4,686,157 A | 8/1987 | Miyake et al. | 4,923,767 A | 5/1990 | Grasso et al. |
| 4,690,690 A | 9/1987 | Andrew et al. | 4,923,768 A | 5/1990 | Kaneko et al. |
| 4,692,306 A | 9/1987 | Minet et al. | 4,925,456 A | 5/1990 | Egglestone |
| 4,693,882 A | 9/1987 | Setzer et al. | 4,935,037 A | 6/1990 | Koyama et al. |
| 4,696,871 A | 9/1987 | Pinto | 4,943,493 A | 7/1990 | Vartanian |
| 4,716,023 A | 12/1987 | Christner et al. | 4,946,750 A | 8/1990 | Nomden et al. |
| 4,722,873 A | 2/1988 | Matsumura | 4,952,380 A | 8/1990 | Najjar et al. |
| 4,729,931 A | 3/1988 | Grimble | 4,971,601 A | 11/1990 | Najjar et al. |
| 4,737,161 A | 4/1988 | Szydlowski et al. | 4,973,528 A | 11/1990 | Sanderson |
| 4,738,903 A | 4/1988 | Garow et al. | 4,973,529 A | 11/1990 | Grasso et al. |
| 4,740,357 A | 4/1988 | Buswell et al. | 4,976,747 A | 12/1990 | Szydlowski et al. |
| 4,741,978 A | 5/1988 | Takabayashi | 4,981,676 A | 1/1991 | Minet et al. |
| 4,743,517 A | 5/1988 | Cohen et al. | 4,985,231 A | 1/1991 | Lywood |
| 4,746,329 A | 5/1988 | Christner et al. | 4,988,580 A | 1/1991 | Ohsaki et al. |
| 4,751,151 A | 6/1988 | Healy et al. | 4,993,368 A | 2/1991 | Jones et al. |
| 4,759,997 A | 7/1988 | Ohyauchi et al. | 4,994,331 A | 2/1991 | Cohen |
| 4,762,532 A | 8/1988 | Lipp | 4,999,029 A | 3/1991 | Lueth et al. |
| 4,765,132 A | 8/1988 | Ahner et al. | 4,999,133 A | 3/1991 | Banquy |
| 4,766,044 A | 8/1988 | Sederquist | 5,000,926 A | 3/1991 | Murayama et al. |
| 4,778,485 A | 10/1988 | Suggitt et al. | 5,004,592 A | 4/1991 | Pinto |
| 4,781,241 A | 11/1988 | Misage et al. | 5,006,131 A | 4/1991 | Karafian et al. |
| 4,781,731 A | 11/1988 | Schlinger | 5,011,625 A | 4/1991 | Le Blanc |
| 4,782,669 A | 11/1988 | Trocciola et al. | 5,011,670 A | 4/1991 | Davis et al. |
| 4,789,384 A | 12/1988 | Martens et al. | 5,013,617 A | 5/1991 | Scheffler |
| 4,789,540 A | 12/1988 | Jenkins | 5,019,356 A | 5/1991 | Silberring |
| 4,791,033 A | 12/1988 | Patel | 5,019,463 A | 5/1991 | Matsubara et al. |
| 4,792,436 A | 12/1988 | Tsai | 5,026,536 A | 6/1991 | Shioiri et al. |
| 4,792,502 A | 12/1988 | Trocciola et al. | 5,030,440 A | 7/1991 | Lywood et al. |
| 4,800,138 A | 1/1989 | Romanowski et al. | 5,030,661 A | 7/1991 | Lywood |
| 4,801,356 A | 1/1989 | Grasso | 5,032,365 A | 7/1991 | Aono et al. |
| 4,804,580 A | 2/1989 | Singelyn | 5,034,287 A | 7/1991 | Kunz |
| 4,804,591 A | 2/1989 | Grasso et al. | 5,035,867 A | 7/1991 | Dang Vu et al. |
| 4,810,485 A | 3/1989 | Marianowski et al. | 5,039,510 A | 8/1991 | Pinto |
| 4,816,040 A | 3/1989 | Bonville et al. | 5,043,232 A | 8/1991 | Landau et al. |
| 4,816,353 A | 3/1989 | Wertheim et al. | 5,045,297 A | 9/1991 | Bonifaz et al. |
| 4,822,521 A | 4/1989 | Fuderer | 5,045,414 A | 9/1991 | Bushnell et al. |
| 4,824,738 A | 4/1989 | Misage et al. | 5,047,299 A | 9/1991 | Shockling |
| 4,824,740 A | 4/1989 | Abrams et al. | 5,059,494 A | 10/1991 | Vartanian et al. |
| 4,826,742 A | 5/1989 | Reiser | 5,064,732 A | 11/1991 | Meyer |
| 4,828,940 A | 5/1989 | Cohen et al. | 5,064,733 A | 11/1991 | Krist et al. |
| 4,830,091 A | 5/1989 | Dierke et al. | 5,071,719 A | 12/1991 | Rostrup-Nielsen et al. |
| 4,830,834 A | 5/1989 | Stahl et al. | 5,079,105 A | 1/1992 | Bossel |
| 4,835,072 A | 5/1989 | Grasso et al. | 5,080,875 A | 1/1992 | Bernauer |
| 4,836,831 A | 6/1989 | Martens | 5,084,363 A | 1/1992 | Reiser |
| 4,838,020 A | 6/1989 | Fujitsuka | 5,087,271 A | 2/1992 | Stellaccio et al. |
| 4,838,897 A | 6/1989 | Amano et al. | 5,092,121 A | 3/1992 | Ahner et al. |
| 4,839,247 A | 6/1989 | Levy et al. | 5,093,178 A | 3/1992 | Sundström et al. |
| 4,841,723 A | 6/1989 | Lau et al. | 5,096,470 A | 3/1992 | Krishnamurthy |
| 4,842,844 A | 6/1989 | Harris et al. | 5,096,674 A | 3/1992 | Shingai |
| 4,844,837 A | 7/1989 | Heck et al. | 5,098,690 A | 3/1992 | Koves |
| 4,847,051 A | 7/1989 | Parenti, Jr. | 5,106,390 A | 4/1992 | Beierle et al. |
| 4,848,387 A | 7/1989 | Hon | 5,106,590 A | 4/1992 | Hopper et al. |
| 4,849,187 A | 7/1989 | Uozu et al. | 5,110,559 A | 5/1992 | Kondo et al. |
| 4,855,192 A | 8/1989 | Grasso | 5,112,578 A | 5/1992 | Murayama et al. |
| 4,861,347 A | 8/1989 | Szydlowski et al. | 5,122,299 A | 6/1992 | LeBlanc |
| 4,865,624 A | 9/1989 | Okada | 5,132,174 A | 7/1992 | Romanowski et al. |

| | | | | | |
|---|---|---|---|---|---|
| 5,141,823 A | 8/1992 | Wright et al. | 5,470,671 A | 11/1995 | Fletcher et al. |
| 5,143,800 A | 9/1992 | George et al. | 5,472,986 A | 12/1995 | van Dijk |
| 5,149,600 A | 9/1992 | Yamase et al. | 5,482,680 A | 1/1996 | Wilkinson et al. |
| 5,152,975 A | 10/1992 | Fong et al. | 5,484,576 A | 1/1996 | Langer et al. |
| 5,156,821 A | 10/1992 | Murayama | 5,484,577 A | 1/1996 | Buswell et al. |
| 5,156,926 A | 10/1992 | Lemoine | 5,486,313 A | 1/1996 | De Jong et al. |
| 5,164,163 A | 11/1992 | Aoki et al. | 5,492,682 A | 2/1996 | Succi et al. |
| 5,169,730 A | 12/1992 | Reichner et al. | 5,496,531 A | 3/1996 | Davis et al. |
| 5,181,937 A | 1/1993 | Karafian et al. | 5,503,944 A | 4/1996 | Meyer et al. |
| 5,193,635 A | 3/1993 | Mizuno et al. | 5,510,056 A | 4/1996 | Jacobs et al. |
| 5,199,961 A | 4/1993 | Ohsaki et al. | 5,516,344 A | 5/1996 | Corrigan |
| 5,200,278 A | 4/1993 | Watkins et al. | 5,518,827 A | 5/1996 | Matsumura et al. |
| 5,202,195 A | 4/1993 | Stedman et al. | 5,520,891 A | 5/1996 | Lee |
| 5,207,185 A | 5/1993 | Greiner et al. | 5,527,631 A | 6/1996 | Singh et al. |
| 5,209,908 A | 5/1993 | Koves et al. | 5,527,632 A | 6/1996 | Gardner |
| 5,213,912 A | 5/1993 | Kunz et al. | 5,529,484 A | 6/1996 | Moard et al. |
| 5,221,586 A | 6/1993 | Morimoto et al. | 5,543,532 A | 8/1996 | Kourtakis et al. |
| 5,226,928 A | 7/1993 | Makabe et al. | 5,546,701 A | 8/1996 | Greiner et al. |
| 5,229,102 A | 7/1993 | Minet et al. | 5,547,776 A | 8/1996 | Fletcher et al. |
| 5,229,222 A | 7/1993 | Tsutsumi et al. | 5,554,347 A | 9/1996 | Busson et al. |
| 5,229,345 A | 7/1993 | Logothetis et al. | 5,554,351 A | 9/1996 | Primdahl |
| 5,235,846 A | 8/1993 | Fanciullo | 5,560,890 A | 10/1996 | Berman et al. |
| 5,242,673 A | 9/1993 | Flytzani-Stephanopoulos et al. | 5,565,009 A | 10/1996 | Ruhl et al. |
| 5,245,110 A | 9/1993 | Van Dijk et al. | 5,567,397 A | 10/1996 | Le Gal et al. |
| 5,248,566 A | 9/1993 | Kumar et al. | 5,567,398 A | 10/1996 | Ruhl et al. |
| 5,248,567 A | 9/1993 | Amemiya et al. | 5,573,866 A | 11/1996 | Van Dine et al. |
| 5,250,270 A | 10/1993 | Noe | 5,578,093 A | 11/1996 | Campbell et al. |
| 5,260,143 A | 11/1993 | Voss et al. | 5,588,974 A | 12/1996 | Tiller et al. |
| 5,260,640 A | 11/1993 | Carabetta et al. | 5,593,640 A | 1/1997 | Long et al. |
| 5,271,916 A | 12/1993 | Vanderborgh et al. | 5,604,047 A | 2/1997 | Bellows et al. |
| 5,275,632 A | 1/1994 | Corrigan | 5,609,834 A | 3/1997 | Hamada et al. |
| 5,290,641 A | 3/1994 | Harashima | 5,612,012 A | 3/1997 | Soma et al. |
| 5,299,536 A | 4/1994 | Moard et al. | 5,618,322 A | 4/1997 | Mizuno et al. |
| 5,300,275 A | 4/1994 | Lywood | 5,628,931 A | 5/1997 | Lednor et al. |
| 5,302,470 A | 4/1994 | Okada et al. | 5,637,415 A | 6/1997 | Meltser et al. |
| 5,308,456 A | 5/1994 | Kunz et al. | 5,639,401 A | 6/1997 | Jacobs et al. |
| 5,316,747 A | 5/1994 | Pow et al. | 5,639,431 A | 6/1997 | Shirasaki et al. |
| 5,326,550 A | 7/1994 | Adris et al. | 5,643,692 A | 7/1997 | Ohmi |
| 5,330,727 A | 7/1994 | Trocciola et al. | 5,645,950 A | 7/1997 | Benz et al. |
| 5,330,857 A | 7/1994 | Sederquist et al. | 5,648,051 A | 7/1997 | Trimble et al. |
| 5,335,628 A | 8/1994 | Dunbar | 5,648,182 A | 7/1997 | Hara et al. |
| 5,340,663 A | 8/1994 | Buswell et al. | 5,651,800 A | 7/1997 | Mizuno et al. |
| 5,341,313 A | 8/1994 | Parrott et al. | 5,669,960 A | 9/1997 | Couche |
| 5,344,721 A | 9/1994 | Sonai et al. | 5,676,911 A | 10/1997 | Baumert et al. |
| 5,346,778 A | 9/1994 | Ewan et al. | 5,700,595 A | 12/1997 | Reiser |
| 5,346,779 A | 9/1994 | Nakazawa | 5,705,138 A | 1/1998 | Le Gal et al. |
| 5,360,679 A | 11/1994 | Buswell et al. | 5,707,917 A | 1/1998 | Geus et al. |
| 5,362,453 A | 11/1994 | Marsch | 5,712,052 A | 1/1998 | Kawatsu |
| 5,366,704 A | 11/1994 | Koves et al. | 5,716,587 A | 2/1998 | Khanmamedov |
| 5,366,818 A | 11/1994 | Wilkinson et al. | 5,718,881 A | 2/1998 | Sederquist et al. |
| 5,366,819 A | 11/1994 | Hartvigsen et al. | 5,728,183 A | 3/1998 | Greiner et al. |
| 5,366,820 A | 11/1994 | Tsutsumi et al. | 5,730,763 A | 3/1998 | Manulescu et al. |
| 5,380,600 A | 1/1995 | Hansen et al. | 5,733,347 A | 3/1998 | Lesieur |
| 5,382,271 A | 1/1995 | Ng et al. | 5,733,675 A | 3/1998 | Dederer et al. |
| 5,419,978 A | 5/1995 | Landau | 5,733,941 A | 3/1998 | Waycuilis |
| 5,421,840 A | 6/1995 | Taylor et al. | 5,741,440 A | 4/1998 | Cooper et al. |
| RE35,002 E | 7/1995 | Matsubara et al. | 5,741,474 A | 4/1998 | Isomura et al. |
| 5,429,809 A | 7/1995 | Stahl et al. | 5,746,985 A | 5/1998 | Takahashi |
| 5,432,021 A | 7/1995 | Wilkinson et al. | 5,750,076 A | 5/1998 | Buswell et al. |
| 5,436,086 A | 7/1995 | Seymour et al. | 5,763,114 A | 6/1998 | Khandkar et al. |
| 5,437,123 A | 8/1995 | Greiner et al. | 5,763,765 A | 6/1998 | Lamont et al. |
| 5,441,546 A | 8/1995 | Moard et al. | 5,769,909 A | 6/1998 | Bonk et al. |
| 5,441,819 A | 8/1995 | Voss et al. | 5,792,572 A | 8/1998 | Foley et al. |
| 5,441,821 A | 8/1995 | Merritt et al. | 5,800,792 A | 9/1998 | Ibaraki et al. |
| 5,447,702 A | 9/1995 | Campbell et al. | 5,823,761 A | 10/1998 | Euzen et al. |
| 5,451,249 A | 9/1995 | Spiegel et al. | 5,840,270 A | 11/1998 | Werth |
| 5,456,889 A | 10/1995 | Pow et al. | 5,840,437 A | 11/1998 | Diethelm |
| 5,458,857 A | 10/1995 | Collins et al. | 5,843,195 A | 12/1998 | Aoyama |
| 5,461,864 A | 10/1995 | Betta et al. | 5,858,314 A | 1/1999 | Hsu et al. |
| 5,462,358 A | 10/1995 | Werner | 5,861,137 A | 1/1999 | Edlund |
| 5,462,719 A | 10/1995 | Pedersen et al. | 5,869,011 A | 2/1999 | Lee |
| 5,464,606 A | 11/1995 | Buswell et al. | 5,874,051 A | 2/1999 | Heil et al. |
| 5,470,360 A | 11/1995 | Sederquist | RE36,148 E | 3/1999 | Strasser |

| | | |
|---|---|---|
| 5,876,469 A | 3/1999 | Moriya et al. |
| 5,897,970 A | 4/1999 | Isomura et al. |
| 5,904,907 A | 5/1999 | Shih |
| 5,914,091 A | 6/1999 | Holst et al. |
| 5,916,529 A | 6/1999 | Scheuerman |
| 5,925,322 A | 7/1999 | Werth |
| 5,931,658 A | 8/1999 | Sederquist et al. |
| 5,935,531 A | 8/1999 | Giacobbe |
| 5,938,800 A | 8/1999 | Verrill et al. |
| 5,939,031 A | 8/1999 | Ellis et al. |
| 5,942,197 A | 8/1999 | Gupta et al. |
| 5,942,203 A | 8/1999 | Van Dijk et al. |
| 6,126,908 A * | 10/2000 | Clawson et al. ............ 422/190 |
| 6,245,303 B1 * | 6/2001 | Bentley et al. ............ 422/193 |

FOREIGN PATENT DOCUMENTS

| | | |
|---|---|---|
| EP | 0 361 648 | 4/1990 |
| EP | 0 600 621 A1 | 6/1994 |
| EP | 0 112 613 | 7/1994 |
| GB | 1060166 | 1/1967 |
| GB | 1 408 560 | 10/1975 |
| GB | 2084894 A | 4/1982 |
| GB | 2179366 A | 3/1987 |
| GB | 2268322 A | 5/1994 |
| JP | 06211501 | 2/1994 |
| WO | WO 97/44123 | 11/1997 |
| WO | WO 98/08771 | 3/1998 |

* cited by examiner

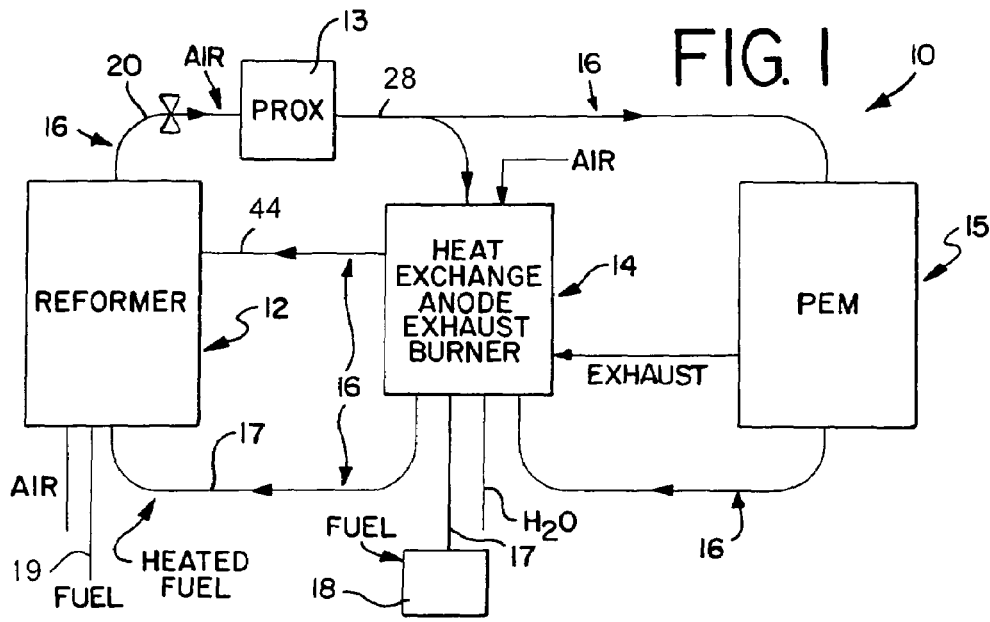
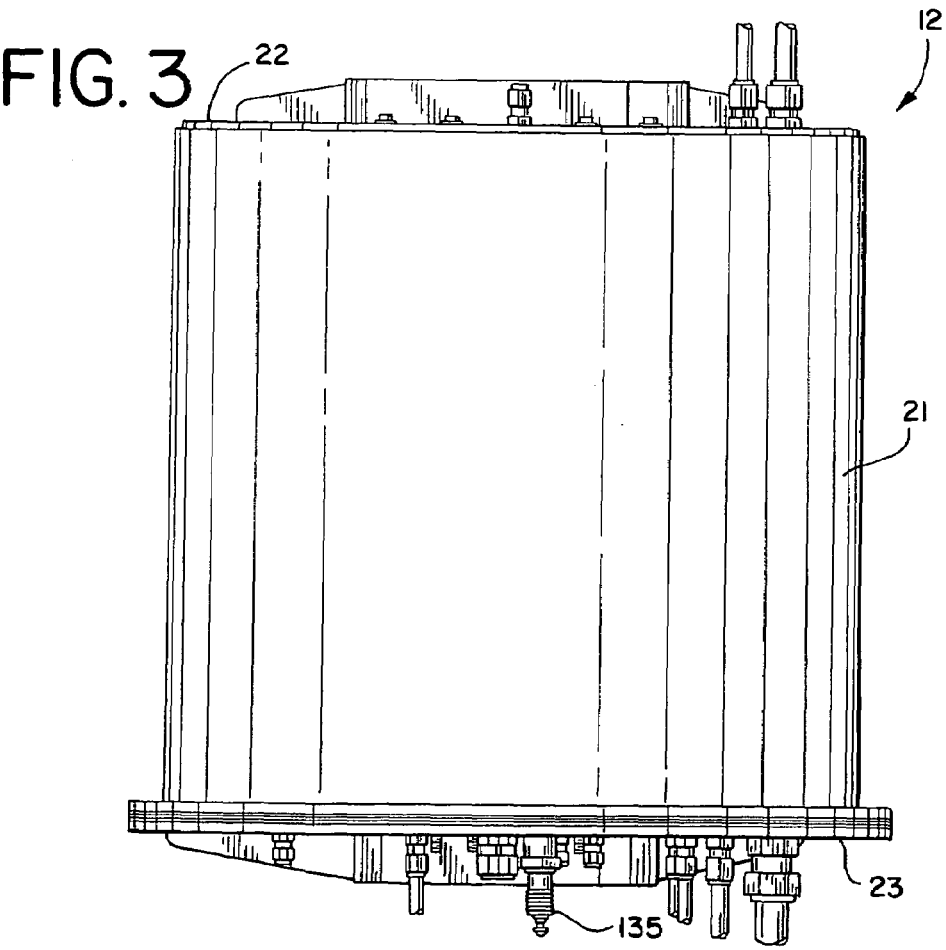

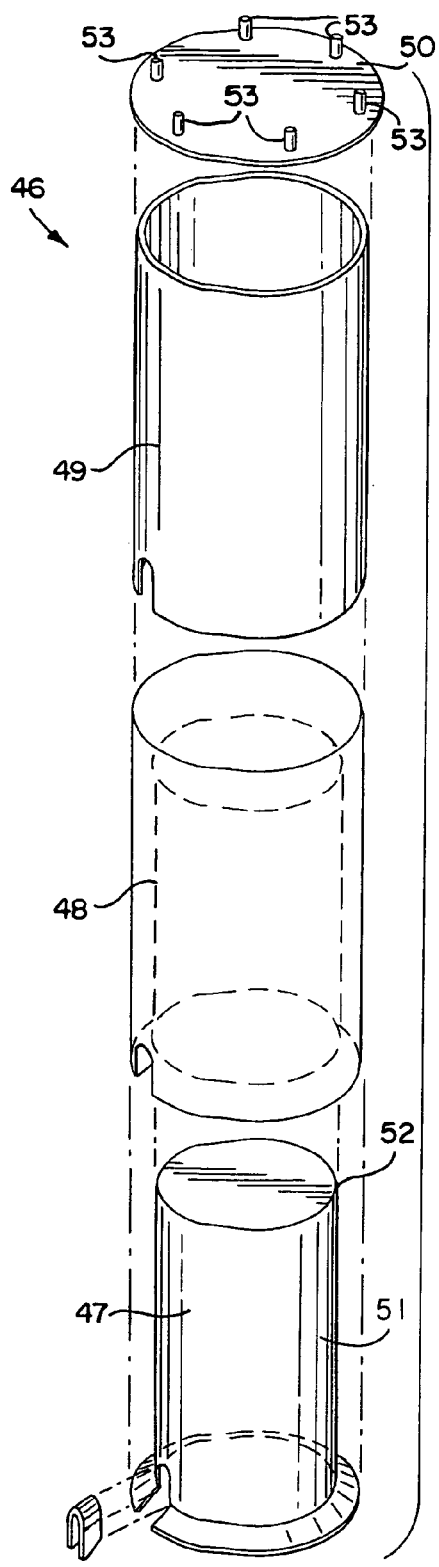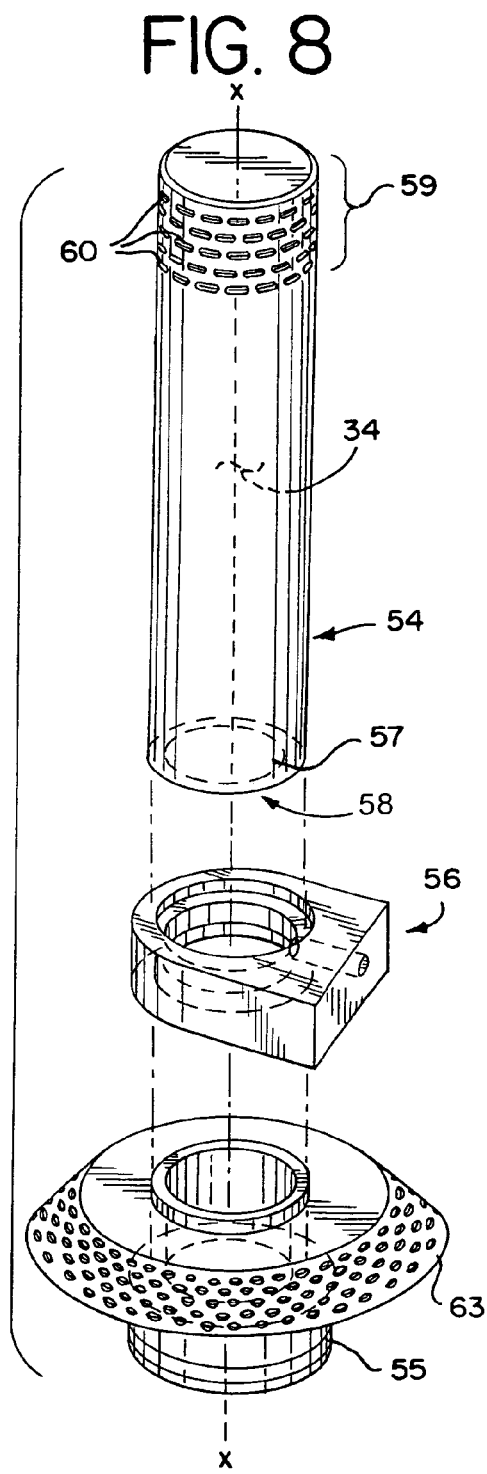
FIG. 7
FIG. 8

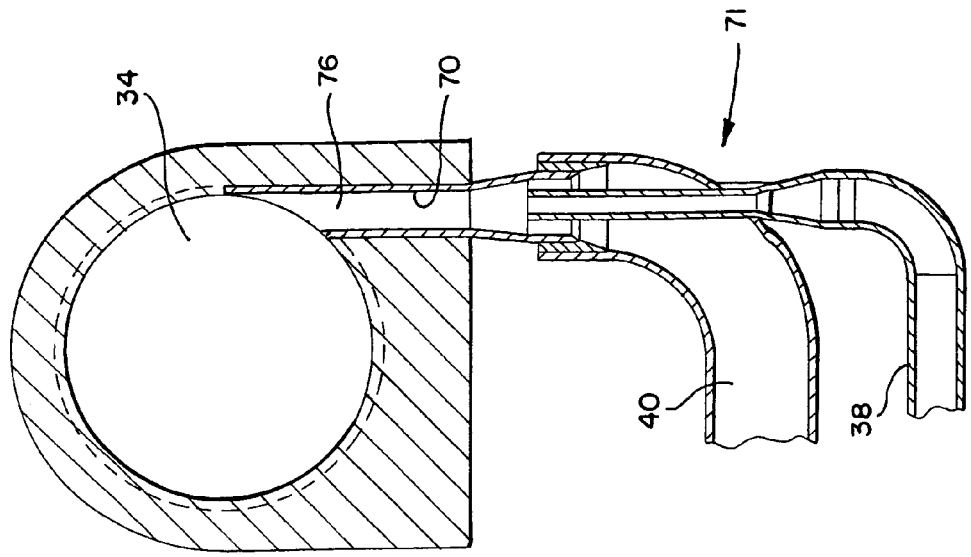
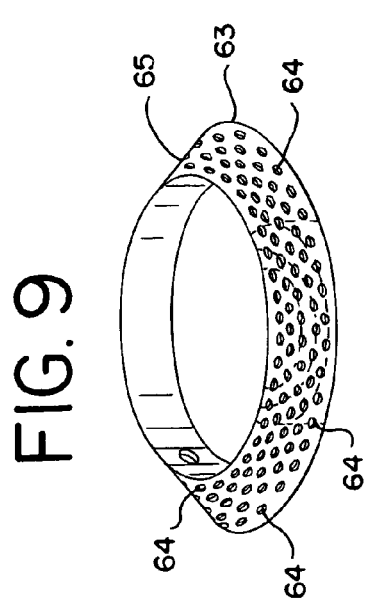
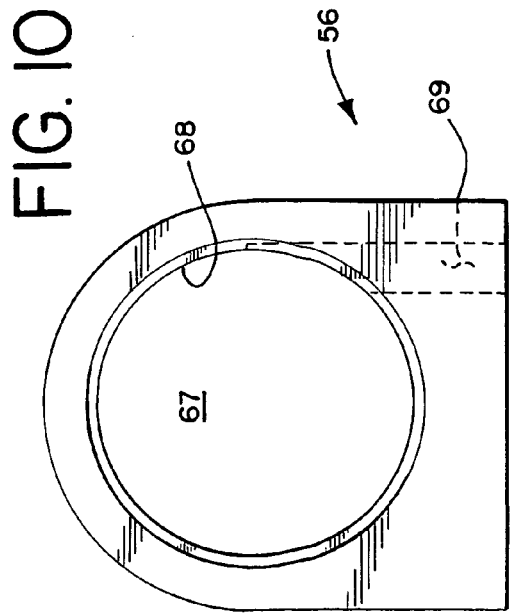

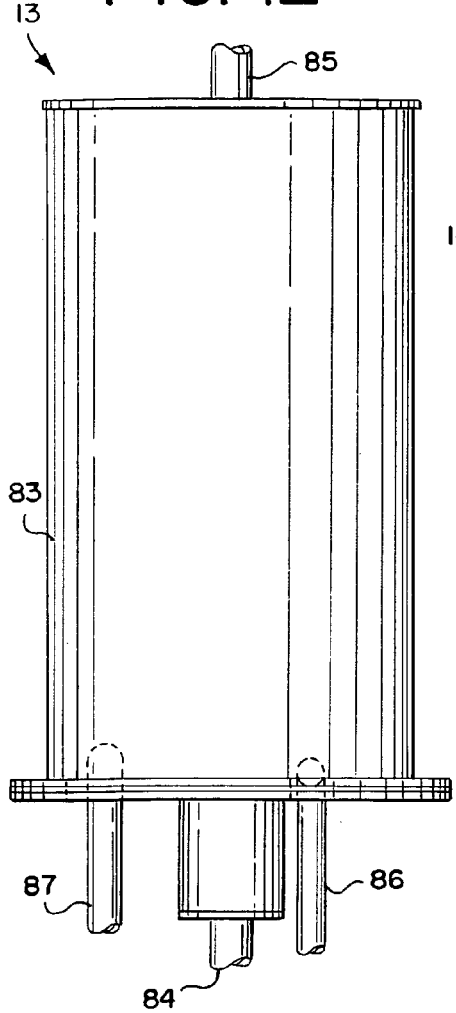
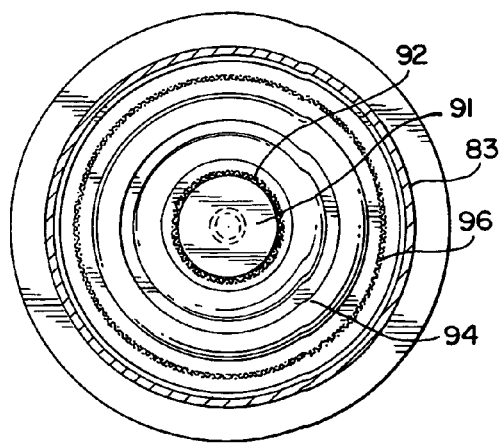

(REFORMATE FLOW)

SCHEMATIC OF AIR, FUEL, STEAM FLOW DURING STARTUP

SCHEMATIC OF WATER/STEAM/FUEL/AIR FLOW - STEADY OPERATION

INTEGRATED REFORMER AND SHIFT REACTOR

RELATED REFERENCES

The present invention claims priority of U.S. Provisional Patent Application Nos. 60/132,184 and 60/132,259, both filed on May 3, 1999. The present invention also claims priority of and is a continuation-in-part of U.S. patent application Ser. No. 09/006,727, filed on Jan. 14, 1998, which became U.S. Pat. No. 6,245,303 on Jun. 12, 2001. The present invention also claims priority of and is a continuation-in-part of U.S. patent application Ser. No. 08/703,398, filed on Aug. 26, 1996, which became U.S. Pat. No. 6,126, 908 on Oct. 3, 2000.

GOVERNMENT RIGHTS

The United States Government has a paid-up license in this invention and the right in limited circumstances to require the patent owner to license others on reasonable terms as provided for by the terms of DE-FC02-97EE50472 awarded by the Department of Energy (DOE).

TECHNICAL FIELD

The present invention is generally related to an integrated hydrocarbon fuel reforming system for reforming a gaseous or liquid hydrocarbon fuel to produce a hydrogen-rich product stream used in, among other things, hydrogen fuel cells. More particularly, the invention is directed to an improved integrated hydrocarbon reforming system, including, an autothermal reformer having distinct zones for partial oxidation reforming and steam reforming, and also having an integrated shift bed for reducing carbon monoxide in the product stream, a preferential oxidation reactor, and an auxiliary reactor.

BACKGROUND OF THE INVENTION

Reforming of hydrocarbon fuels to make hydrogen is well known in the art. Conventionally, hydrocarbons are reformed predominately in large-scale industrial facilities providing hydrogen for bulk storage and redistribution, or producing hydrogen as an on-line, upstream reagent for another large-scale chemical process. For the most part, these prior processes operate continuously and at steady-state conditions.

More recently, however, a strong interest has developed in providing hydrocarbon-reforming reactors integrated with an end use of the hydrogen. Also, there is a strong interest to develop a low-cost, small-scale source for hydrogen that can replace the need for storing hydrogen gas on site or on board. More particularly, a great interest has developed in providing reactors for producing hydrogen, which can be integrated with a fuel cell which uses hydrogen as a fuel source to generate electricity. Such hydrogen generator/fuel cell systems are being pursued for stationary uses such as providing electrical power to a stationary facility (home or business), for portable electric power uses, and for transportation.

The use of fuel cells, such as polymer electrolyte membrane fuel cells (PEM-FC), has been proposed for many applications, specifically including electrical vehicular power plants used to replace internal combustion engines. Electrochemical fuel cells convert fuel and oxidant to electricity and reaction product. Hydrogen is most commonly used as the fuel and is supplied to the fuel cell's anode. Oxygen (commonly as air) is the cell's oxidant and is supplied to the cell's cathode. The reaction product is water.

Efficiency and low emissions are two benefits of fuel cell systems. A system running near 40% efficiency will offer the opportunity to significantly reduce fuel consumption and $CO_2$ production compared to conventional gasoline internal combustion engines. Perhaps more importantly, it has been shown that fuel cell systems, even when running with an onboard fuel processor, offer an opportunity to greatly reduce emissions of NOx, carbon monoxide, and hydrocarbons in automotive applications.

There are many technical requirements for reactors used in such applications, which are not required of traditional large or small-scale hydrogen generating reactors. For example, it is of particular interest to have such a system where the fuel cell can provide "power on demand." Hence, hydrogen must be produced at required variable levels on demand. In other words, the hydrogen producing reactors must be sufficiently dynamic to follow the load. It is also of interest that such systems perform well upon start-up and shutdown cycling. In particular, it is desirable to have these integrated systems be stable through repeated on-off cycling including being ready to come back on-line in a relatively short time.

Another marked difference between proposed integrated systems and traditional reactors is that there must be sufficient processing in the integrated system itself, of the hydrocarbon feed stock so as to not only give a yield of hydrogen sufficient to meet the demand, but also to minimize byproducts of reaction including contaminants. In large-scale reactor systems, which produce enormous volumes and run continuously; space, weight, and cost of auxiliary systems is not so critical as in the integrated, smaller-scale reformers, especially those proposed for portable power or transportation applications. For example, carbon monoxide may be considered an undesirable reaction product on board a fuel cell powered automobile. However, in a steady state conventional process, the carbon monoxide can easily be handled by auxiliary separation systems, and may in fact be welcomed for its use in a synthesis gas to make acetic acid, dimethyl ether, and alcohols.

In short, the challenge for the smaller-scale, dynamic, integrated processors is the idea that what goes in the reformer, must come out at the same end as the desired hydrogen gas. Accordingly, processing has to be more complete and efficient, while it must also be cost effective, lightweight, and durable. The processing must be sufficient to reduce or eliminate species in the product gas which are harmful to the end use (for example, fuel cells) or other down stream components.

Another challenge exists for the proposed integrated systems with respect to the hydrocarbon feed stock. To be of maximum benefit, the proposed integrated systems should be able to use existing infrastructure fuels such as gasoline or diesel fuels. These fuels were not designed as a feed stock for generating hydrogen. Because of this, integrated systems are challenged to be able to handle the wide variety of hydrocarbons in the feed stock. For example, certain reforming byproducts such as olefins, benzene, methyl amide, and higher molecular weight aromatics can cause harm to catalysts used in reforming or purifying steps and may harm the fuel cell itself. Impurities in these fuels such as sulfur and chlorine can also be harmful to reactor catalysts and to the fuel cell.

It is also important to note, that a natural byproduct of hydrocarbon reforming is carbon monoxide. Carbon monoxide can poison proton exchange membrane fuel cells, even at very low concentrations of, for example, less than 100 ppm. Typical carbon monoxide levels exiting a fuel processing assembly ("FPA") are about 2,000 to 5,000 ppm. This poses a problem for an integrated reactor system that is not faced by traditional reforming processes where significant carbon monoxide concentrations are either a useful co-product, or can be separated from the product gas without undue burden on the system economics as a whole.

Also, as noted above, integrated systems proposed to date are expected to transfer the total of the reformate to a fuel cell. Accordingly, techniques which separate carbon monoxide from hydrogen, such as pressure swing adsorption ("PSA") or hydrogen permeable membrane separation, have the deficit of having to provide an alternate means for disposal or storage of the carbon monoxide. Both of the aforementioned techniques also suffer in efficiency as neither converts the carbon monoxide (in the presence of water) to maximize hydrogen production. PSA also suffers from high cost and space requirements, and presents a likely unacceptable parasitic power burden for portable power or transportation applications. At the same time, hydrogen permeable membranes are expensive, sensitive to fouling from impurities in the reformate, and reduce the total volume of hydrogen in the reformate stream.

One known method of reforming gaseous or liquid hydrocarbon fuels is by catalytic steam reforming. In this process a mixture of steam and the hydrocarbon fuel is exposed to a suitable catalyst at a high temperature. The catalyst used is typically nickel and the temperature is usually between about 700° C. and about 1000° C. In the case of methane, or natural gas, hydrogen is liberated in a catalytic steam reforming process according to the following overall reaction:

$$CH_4 + H_2O \rightarrow CO + 3H_2 \quad (1)$$

This reaction is highly endothermic and requires an external source of heat and a source for steam. Commercial steam reformers typically comprise externally heated, catalyst filled tubes and rarely have thermal efficiencies greater than about 60%.

Another conventional method of reforming a gaseous or liquid hydrocarbon fuel is partial oxidation (POx) reforming. In these processes a mixture of the hydrocarbon fuel and an oxygen containing gas are brought together within a POx chamber and subjected to an elevated temperature, preferably in the presence of a catalyst. The catalyst used is normally a noble metal or nickel and the high temperature is normally between about 700° C. and about 1200° C. for catalyzed reactions, and about 1200° C. to about 1700° C. for non-catalyzed reactions. In the case of methane, or natural gas, hydrogen is liberated in a POx chamber according to the following overall reaction:

$$CH_4 + \tfrac{1}{2}O_2 \rightarrow CO + 2H_2 \quad (2)$$

This reaction is highly exothermic and once started generates sufficient heat to be self sustaining. That is, no external heat supply or steam supply is required. The catalytic partial oxidation reforming technique is simpler than the catalytic steam reforming technique, but is not as thermally efficient as catalytic steam reforming.

An additional known method of reforming a hydrocarbon fuel is by autothermal reforming, or "ATR". An autothermal reformer uses a combination of steam reforming and partial oxidation reforming. Waste heat from the partial oxidation reforming reaction is used to heat the thermally steam reforming reaction. An autothermal reformer may in many cases be more efficient than either a catalytic steam reformer or a catalytic partial oxidation reformer. Again, using methane, or natural gas, as the hydrocarbon fuel, hydrogen is liberated according to the following overall reaction:

$$CH_4 + yH_2O + (1-y/2)O_2 \rightarrow CO_2 + (2+y)H_2, \text{ where } 0<y<2 \quad (3)$$

Consideration of the standard enthalpies of formation shows that autothermal operation is theoretically achieved when y=1.115.

In addition to the reforming reactions discussed above it is usually necessary to consider the effects of another reaction occurring, the so called "water gas shift reaction." Because the equilibrium of this reversible reaction is temperature (T) dependent, and at high temperatures carbon monoxide and water tend to be produced, the effects warrant consideration. In the water gas shift reaction the following overall reaction occurs:

$$CO + H_2O_{(g)} \leftrightarrow CO_2 + H_2 \quad (4)$$

More favorably, however, is that given equilibrium conversion at low temperatures carbon dioxide and hydrogen tend to be produced.

Typical reformers produce carbon dioxide and hydrogen, and consequently some carbon dioxide and hydrogen react to produce concentrations of carbon monoxide and water due to the reverse water gas shift reaction occurring in the reforming chamber. As mentioned previously, this is undesirable because the concentration of carbon monoxide must be either completely removed or at least reduced to a low concentration—i.e., less than about 100 ppm after the shift reaction—to avoid poisoning the anode of the PEM-FC. Carbon monoxide concentrations of more than 20 ppm reaching the PEM-FC can quickly poison the catalyst of the fuel cell's anode. In a shift reactor, water (i.e., steam) is added to the hydrocarbon reformate/effluent exiting the reformer, in the presence of a suitable catalyst, to lower its temperature, and increase the steam to carbon ratio therein. The higher steam to carbon ratio serves to lower the carbon monoxide content of the reformate to less than 100 ppm according to the shift reaction (4) above. Ideally, the carbon monoxide concentration can be maintained below 1 ppm with the right shift catalyst, but the temperature required for this, about 100° C.–125° C., is too low for operation of current shift catalysts.

Advantageously, it is possible to recover some hydrogen at the same time by passing the product gases leaving the reformer, after cooling, into a shift reactor where a suitable catalyst promotes the carbon monoxide and water/steam to react to produce carbon dioxide and hydrogen. The shift reactor provides a convenient method of reducing the carbon monoxide concentration of the reformer product gases, while simultaneously improving the yield of hydrogen.

However, some carbon monoxide still survives the shift reaction. Depending upon such factors as reformate flow rate and steam injection rate, the carbon monoxide content of the gas exiting the shift reactor can be as low as 0.5 mol percent. Any residual hydrocarbon fuel is easily converted to carbon dioxide and hydrogen in the shift reactor. Hence, shift reactor effluent comprises not only hydrogen and carbon dioxide, but also water and some carbon monoxide.

The shift reaction is typically not enough to sufficiently reduce the carbon monoxide content of the reformate (i.e., below about 100 ppm). Therefore, it is necessary to further remove carbon monoxide from the hydrogen-rich reformate stream exiting the shift reactor, prior to supplying it to the fuel cell. It is known to further reduce the carbon monoxide content of hydrogen-rich reformate exiting a shift reactor by a so-called preferential oxidation ("PrOx") reaction (also known as "selective oxidation") effected in a suitable PrOx reactor. A PrOx reactor usually comprises a catalyst bed which promotes the preferential oxidation of carbon monoxide to carbon dioxide by air in the presence of the diatomic hydrogen, but without oxidizing substantial quantities of the $H_2$ itself. The preferential oxidation reaction is as follows:

$$CO + \tfrac{1}{2}O_2 \rightarrow CO_2 \qquad (5)$$

Desirably, the $O_2$ required for the PrOx reaction will be no more than about two times the stoichiometric amount required to react the CO in the reformate. If the amount of $O_2$ exceeds about two times the stoichiometric amount needed, excessive consumption of $H_2$ results. On the other hand, if the amount of $O_2$ is substantially less than about two times the stoichiometric amount needed, insufficient CO oxidation will occur. The PrOx process is described in a paper entitled "Preferential Oxidation of CO over Pt/γ-$Al_2O_3$ and Au/α-$Fe_2O_3$: Reactor Design Calculations and Experimental Results" by M. J. Kahlich, et al. published in the *Journal of New Materials for Electrochemical Systems*, 1988 (pp. 39–46), and in U.S. Pat. No. 5,316,747 to Pow et al.

PrOx reactions may be either (1) adiabatic (i.e., where the temperature of the reformate (syngas) and the catalyst are allowed to rise during oxidation of the CO), or (2) isothermal (i.e., where the temperature of the reformate (syngas) and the catalyst are maintained substantially constant during oxidation of the CO). The adiabatic PrOx process is typically effected via a number of sequential stages which progressively reduce the CO content. Temperature control is important in both systems, because if the temperature rises too much, methanation, hydrogen oxidation, or a reverse shift reaction can occur. This reverse shift reaction produces more undesirable CO, while methanation and hydrogen oxidation negatively impact system efficiencies.

In either case, a controlled amount of $O_2$ (e.g., as air) is mixed with the reformate exiting the shift reactor, and the mixture is passed through a suitable catalyst bed known to those skilled in the art. To control the air input, the CO concentration in the gas exiting the shift reactor is measured, and based thereon, the $O_2$ concentration needed for the PrOx reaction is adjusted. However, effective real time CO sensors are not available and accordingly system response to CO concentration measurements is slow.

For the PrOx process to be most efficient in a dynamic system (i.e., where the flow rate and CO content of the hydrogen-rich reformate vary continuously in response to variations in the power demands on the fuel cell system), the amount of $O_2$ (e.g., as air) supplied to the PrOx reactor must also vary on a real time basis in order to continuously maintain the desired oxygen-to-carbon monoxide concentration ratio for reaction (5) above.

Another challenge for dynamic operation is that the reformate at start-up contains too much carbon monoxide for conversion in the PrOx reactor and, therefore, is not suitable for use in a PEM-FC. One approach to this problem is to discharge this unsuitable reformate without benefit, and potentially to the detriment of the environment. The partially reformed material may contain unacceptable levels of hydrocarbons, carbon monoxide, sulfur, noxious oxides, and the like. It would be an advantage to provide a process which utilizes the waste reformate to assist in the preheating of unreformed fuel before its entry into the reforming chamber, while simultaneously converting the harmful constituents of the waste reformate to acceptable emissions.

A PEM-FC typically does not make use of 100% of the incoming hydrogen from the reformer/reactor. Therefore, anode gases—mostly unused hydrogen—are discharged from the fuel cell simultaneous with the input of hydrogen. It would be an advantage in the industry to make use of this combustible material to assist the preheating of unreformed hydrocarbon fuel or for steam generation. Systems already proposed employ so called "tail gas combusters" to burn off such fuel cell exhaust gases.

The present invention addresses the above problems and challenges and provides other advantages as will be understood by those in the art in veiw of the following specification and claims.

SUMMARY OF THE INVENTION

A hydrocarbon fuel reformer for producing diatomic hydrogen gas is disclosed. One embodiment of the present reformer comprises a first reaction vessel, a shift reactor vessel annularly disposed about the first reaction vessel, including a first shift reactor zone, and a first helical tube disposed within the first shift reactor zone having an inlet end communicating with a water supply source.

It is an aspect of the invention to provide the reformer wherein the water supply source is adapted to supply liquid-phase water to the first helical tube at flow conditions sufficient to ensure discharge of liquid-phase and steam-phase water from an outlet end of the first helical tube. The reformer may further comprise a first catalyst bed disposed in the first shift reactor zone, including a low-temperature shift catalyst in contact with the first helical tube.

It is another aspect of the invention wherein the catalyst bed includes a plurality of coil sections disposed in coaxial relation to other coil sections and to the central longitudinal axis of the reformer, each coil section extending between the first and second ends, and each coil section being in direct fluid communication with at least one other coil section.

In a further embodiment a reactor for producing hydrogen from hydrocarbons is disclosed comprising a reaction vessel, a first shift reaction zone in the reaction vessel, the shift reaction zone containing a first shift catalyst, and a boiler tube in the reaction vessel for carrying a heat transfer medium, the tube being located so as to permit heat transfer between a first portion of the tube and reaction constituents in the first shift zone.

It is an aspect of at least the further embodiment of the present invention to include a second shift reaction zone containing a second shift catalyst, and the boiler tube being located so as to permit heat transfer between a second portion of the tube and reaction constituents in the second shift zone.

It is also an aspect of the invention to provide a fuel processor for producing diatomic hydrogen gas comprising a vessel having a first end, a second end, and an outer wall, a partial oxidation zone disposed in the vessel, extending between the first and second ends, and bounded by a first inner wall, a steam reforming zone interposed between the first inner wall and the outer wall, the first inner wall having a port disposed near the first end to define a first transition between a first flow path of reactants through the partial oxidation zone and a second flow path of reactants through the steam reforming zone in a direction substantially opposite the first flow path.

Still another aspect of the present invention is to provide a combustion vessel in a fuel processor comprising a mixing section having a curved inner profile, a first outlet section in fluid communication with the mixing section, and an inlet section configured to inject reactants into the mixing section along a tangent of the curved inner profile, wherein a statistically significant percentage of volumetric units of reactants injected into the mixing section from the inlet section travel in a direction conforming to the curved inner profile and mix with formerly injected volumetric units of reactants prior to flowing into the outlet section.

It is still another aspect of the present invention to provide a shift reactor for subjecting carbon monoxide and water to a water-gas shift reaction to produce carbon dioxide and diatomic hydrogen. The shift reactor comprising a shift reactor vessel including a first shift reaction zone, the first shift reaction zone having an input side for receiving reformate constituents including carbon monoxide and an outlet side for discharging shift-reacted constituents including carbon dioxide and hydrogen gas, and a first helical tube disposed within the first shift reaction zone, the first helical tube having an inlet end communicating with an oxygen-containing gas supply source and an outlet end communicating with a fuel processing vessel.

It is an aspect of this embodiment wherein the shift reactor vessel has a central longitudinal axis, the first shift reaction zone has a first end and a second end, and the first helical tube includes a plurality of coiled sections, each coiled section being disposed in coaxial relation to the other coiled sections and to the central longitudinal axis, each coiled section also being disposed between the first and second ends of the first shift reaction zone, and in direct fluid communication with at least one other coiled section.

The first helical tube is preferably configured to permit the oxygen-containing gas to travel through each coiled section in a direction opposite to a direction traveled by the oxygen-containing gas through an adjacent coiled section. A first catalyst bed is preferably disposed in the first shift reaction zone, and includes a high-temperature shift catalyst in contact with the first helical tube. Preferably the shift reactor vessel is annularly disposed about the fuel processing vessel.

These and other aspects of the present invention set forth in the appended claims may be realized in accordance with the following disclosure with particular reference to the accompanying drawings.

BRIEF DESCRIPTION OF THE DRAWINGS

The following descriptions of the present invention are discussed with particular reference to the appended drawings of which:

FIG. 1 is a schematic view of one embodiment of a system of the present invention showing the relationship of selected sub-systems to one another;

FIG. 3 is a side view of one embodiment of a reformer reactor sub-system of the present invention;

FIG. 7 is an exploded view of an autothermal reforming vessel of the reformer reactor shown in FIG. 6;

FIG. 8 is an exploded view of a POx chamber of the reformer shown in FIG. 6;

FIG. 9 is a top view of a steam ring of the reformer shown in FIG. 6;

FIG. 10 is a top cross-sectional view of an air inlet section of the POx chamber shown in FIG. 8;

FIG. 11 is a cross-sectional view of a pre-mixing manifold shown in FIG. 6;

FIG. 12 is a side view of one embodiment of the PrOx reactor of the present invention;

FIG. 13 is a side cross-sectional view of the PrOx reactor shown in FIG. 12;

FIG. 14 is a top cross-sectional view of the PrOx reactor shown in FIG. 12;

DETAILED DESCRIPTION OF PREFERRED EMBODIMENT

Figure 2:
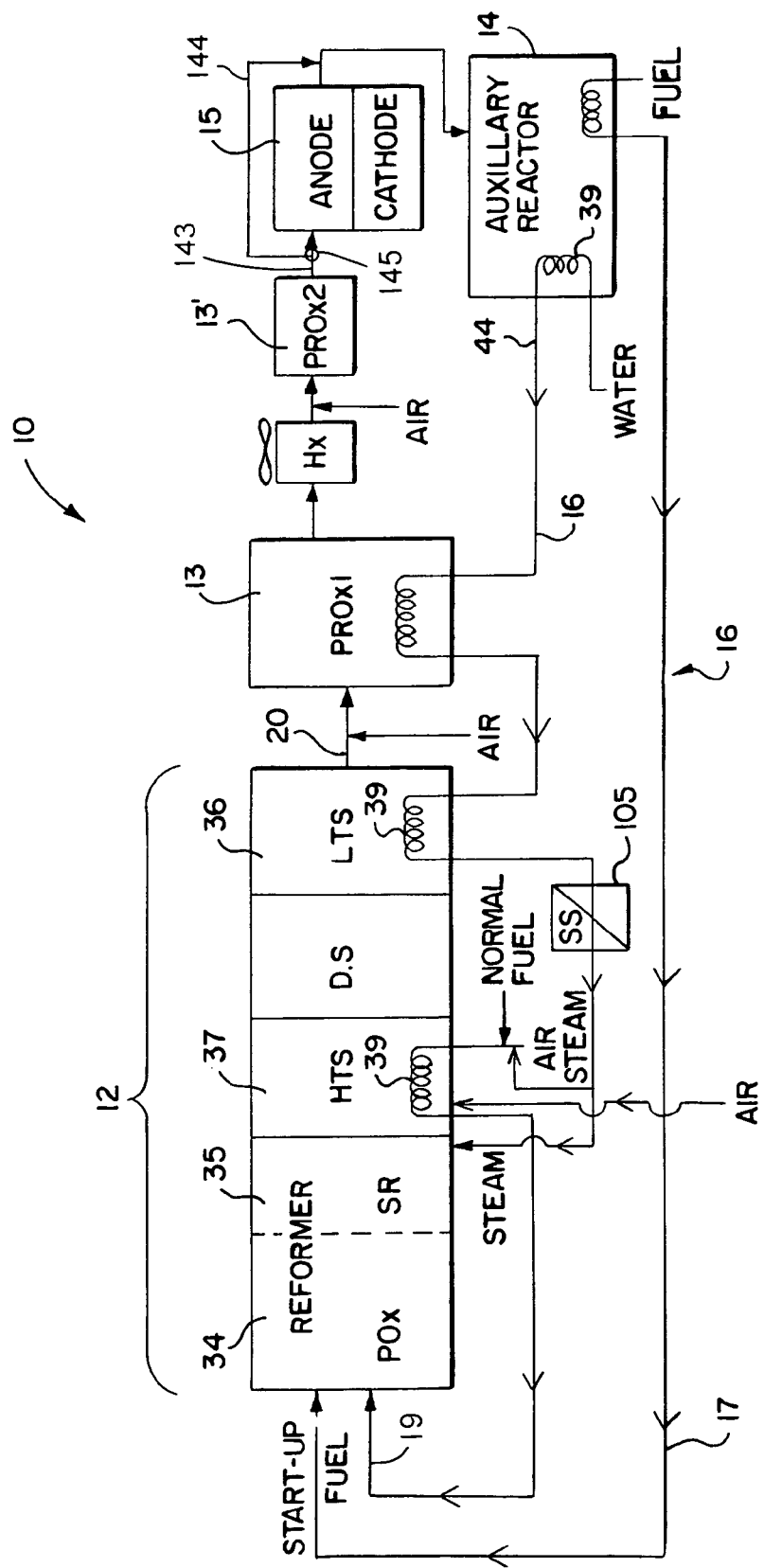
FIG. 2 is a schematic view of another embodiment of the system of the present invention showing fluid transport and flow between sub-systems.

While the present invention is susceptible of embodiment in many different forms, this disclosure will described in detail, preferred embodiments of the invention with the understanding that the present disclosure is to be considered as an exemplification of the principles of the invention and is not intended to limit the broad aspect of the invention to the embodiments discussed or illustrated.

I. System and Sub-System Structure

Referring generally to the appended FIGS. 1–28, the hydrocarbon reforming process and apparatus of the present invention can be more readily understood. The disclosed hydrocarbon reforming system architecture is generally referenced by the number "10" in the following disclosure and drawings. Other specific components, such as the reforming chambers, catalyst beds, auxiliary reactors (e.g., PrOx reactors, tail gas combusters, etc.), and their respective parts, are similarly and consistently numbered throughout this disclosure. While the present hydrocarbon reforming system 10 is disclosed in combination with a PEM-fuel cell, such as those used for transportation systems and the like, the systems and components according to the invention may be employed in other applications calling for a supply of hydrogen-rich syngas. More particularly, the disclosed systems and subcomponents thereof will be preferred in applications where size, weight, portability, and energy efficiencies are desired Examples of such uses include portable power units, transportation, on demand merchant hydrogen, and small power plant (e.g., household backup or primary power systems).

As shown in FIG. 1, the integrated hydrocarbon reforming system 10 ("system," "reforming system," and like variations) is comprised of a reformer reactor 12, a preferential oxidation reactor 13 (PrOx), an auxiliary reactor 14, an associated fuel cell 15, and a network of fluid transport structure 16. In general, the reformer reactor 12 is downstream of the auxiliary reactor 14 and is in fluid communication therewith via fuel line 17. The reformer reactor 12 is in turn upstream of the PrOx reactor 13 and is in fluid communication therewith via conduit 20.

In this embodiment, the auxiliary reactor 14 can be used with liquid hydrocarbon fuels to preheat, desulfurize, and/or to vaporize the fuel before transfer through fuel line 17 to the reformer reactor 12. This preheating may be used only for a temporary period such as during reformer start-up, as exemplified in FIG. 2. In that embodiment, the fuel preheat/vaporization task (and the hydrocarbon fuel source) is transferred to heat exchangers within a shift catalyst bed in the reformer 12 after the shift bed has risen to a desired temperature after start-up. The auxiliary reactor 14 can also be used to desulfurize liquid hydrocarbon feed stocks. In a preferred method, the desulfurization is carried out catalytically. The hydrocarbon fuel is transported from a hydrocarbon fuel source 18 to the auxiliary reactor 14 via fuel line 17. The auxiliary reactor 14 may also be used to heat or preheat water to make steam used in the reformer 12 as a reactant and/or a heat transfer medium. The auxiliary reactor 14 can also be used to react excess hydrogen and other gases exhausted from the anode of the fuel cell 15. Any heat from this reaction may be synergistically used in the aforementioned preheating or desulfurization processes. The auxiliary reactor 14 may also be used to combust reformate from the reformer 12 as desired. For example, upon start up or other circumstances when the reformate may not be of desired quality to transfer to the PrOx reactor 13 or the fuel cell 15, then it can be optionally routed to the auxiliary reactor 14 via a valve 28 in conduit 16. Again, any heat from this reaction may be synergistically used in the aforementioned preheating or desulfurization processes. Details of various embodiments of auxiliary reactor 14 are disclosed in detail below. With each embodiment, a preferred fuel or system support function is disclosed.

In the system 10, water is first introduced from a reservoir to the auxiliary reactor 14. Depending on the desired heating, the water is transferred as heated water, steam or two phase water-steam. Of course the level of heating is a matter of particular design relative to the particular system goals as exemplified by the preferred embodiments below. The water/steam/steam-water is synergistically transferred to the reformer 12. Depending on system goals and design, the water/steam/water-steam can be routed through heat exchangers in shift catalyst beds (see for example, FIG. 6 and reformer 12 with heat exchangers 39 or boiler tubes, embedded in a low temperature shift ("LTS") catalyst bed 36). The water/steam/water-steam may also be directed to heat exchangers in the PrOx reactor 13 for additional heat exchange with reformate during the exothermic reactions proceeding therein.

In alternate embodiments, an alternate source of vaporized fuel may also be supplied to the reformer 12 directly by such as supply line 19 disclosed in FIGS. 1 and 2. In this embodiment, the auxiliary reactor 14 is used to provide vaporized fuel to the reformer 12 during start-up. Upon reaching a desired temperature in a high temperature shift ("HTS") bed 37, hydrocarbon feed stock is then fed directly into heat exchangers 39 in the HTS 37 to preheat/vaporize the fuel before reaction. The fuel supply from the auxiliary reactor 14 can then be terminated.

Air is supplied to the system 10 at various points including at the fuel inlet to the HTS bed 37, and at the conduit between the LTS bed 36 and the PrOx reactor 13. Greater detail on these operations are found later in this specification (see section below, System and Sub-System Control and Operation). The reformate flow is illustrated separately in FIG. 26.

A. Reformer Reactor

One reformer 12 preferred for the present system 10 (FIG. 1) is disclosed in FIGS. 3–11. In overview, in accordance with aspects of the invention, an autothermal fuel reformer is uniquely spatially and thermally integrated. Also, the autothermal reformer is housed and integrated spatially and thermally with water-gas shift reactors. Also spatially and thermally integrated into the reformer 12 are unique heat exchangers 39 for preheating air and fuel, generation of steam, and active cooling of various reaction zones. Advantageously, steam generated in shift catalyst beds of reformer 12 provide a rapidly-deliverable supply of steam for combustion upon increased demand on the system 10.

Figure 4:
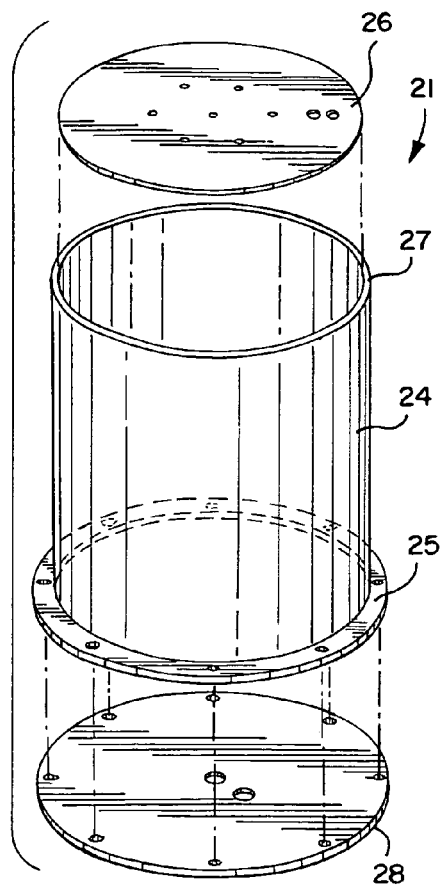
FIG. 4 is an exploded view of a pressure vessel shell of the reformer reactor of FIG. 3.
Figure 5:
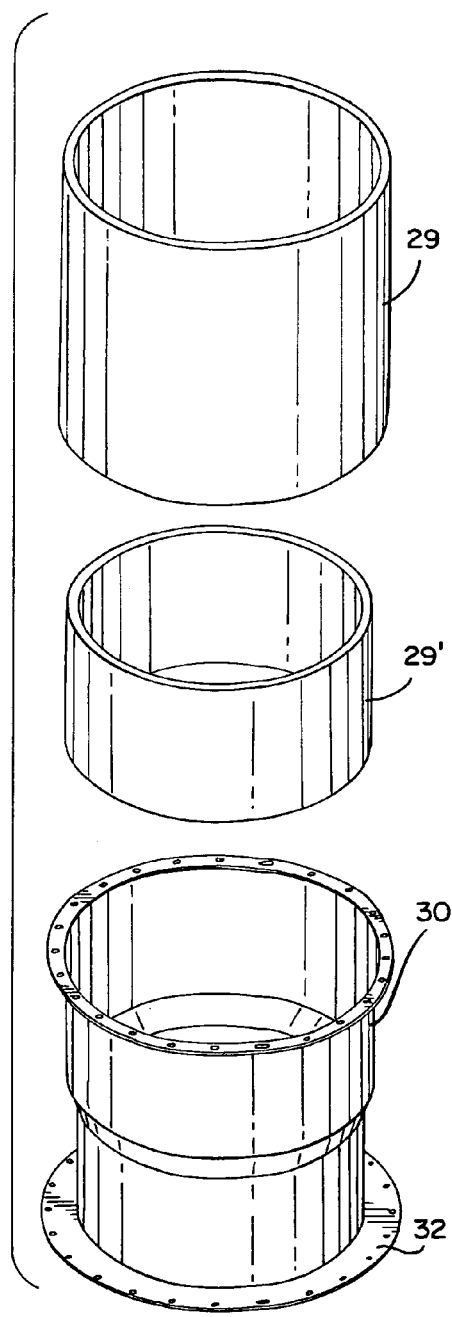
FIG. 5 is an exploded view of an inner protective shell of the reformer reactor of FIG. 3.

The reformer shell shown in FIGS. 4 and 5, is generally comprised of a pressure containing cylinder 21, thermal insulation rings 29, 29', and an inner protective sleeve 30. As disclosed in FIG. 6, these components are coaxially nested and closed at axially opposed ends, 22 and 23, of cylinder 21 by end plates 26 and 28, respectively. As such, the cylinder 21 provides pressure containment, the insulation rings 29, 29' isolate the cylinder 24 from reaction temperatures, and the sleeve 30 prevents erosion or contamination of the insulating rings 29, 29'.

The outer cylinder 24 has a peripheral flange 25 along its lower peripheral edge, and is preferably manufactured from a high grade stainless steel, or an equally strong and flexible metal or alloy. It is desirable that the cylinder 24 be capable of withstanding internal pressures (e.g., one preferred method of operation maintains reformer pressures at about three atmospheres). The top plate 26 sits within a seat 27 defined in a circumferential top edge of the cylinder 24. This, with suitable gasketing forms a seal at one end of the reformer 12.

Figure 6:
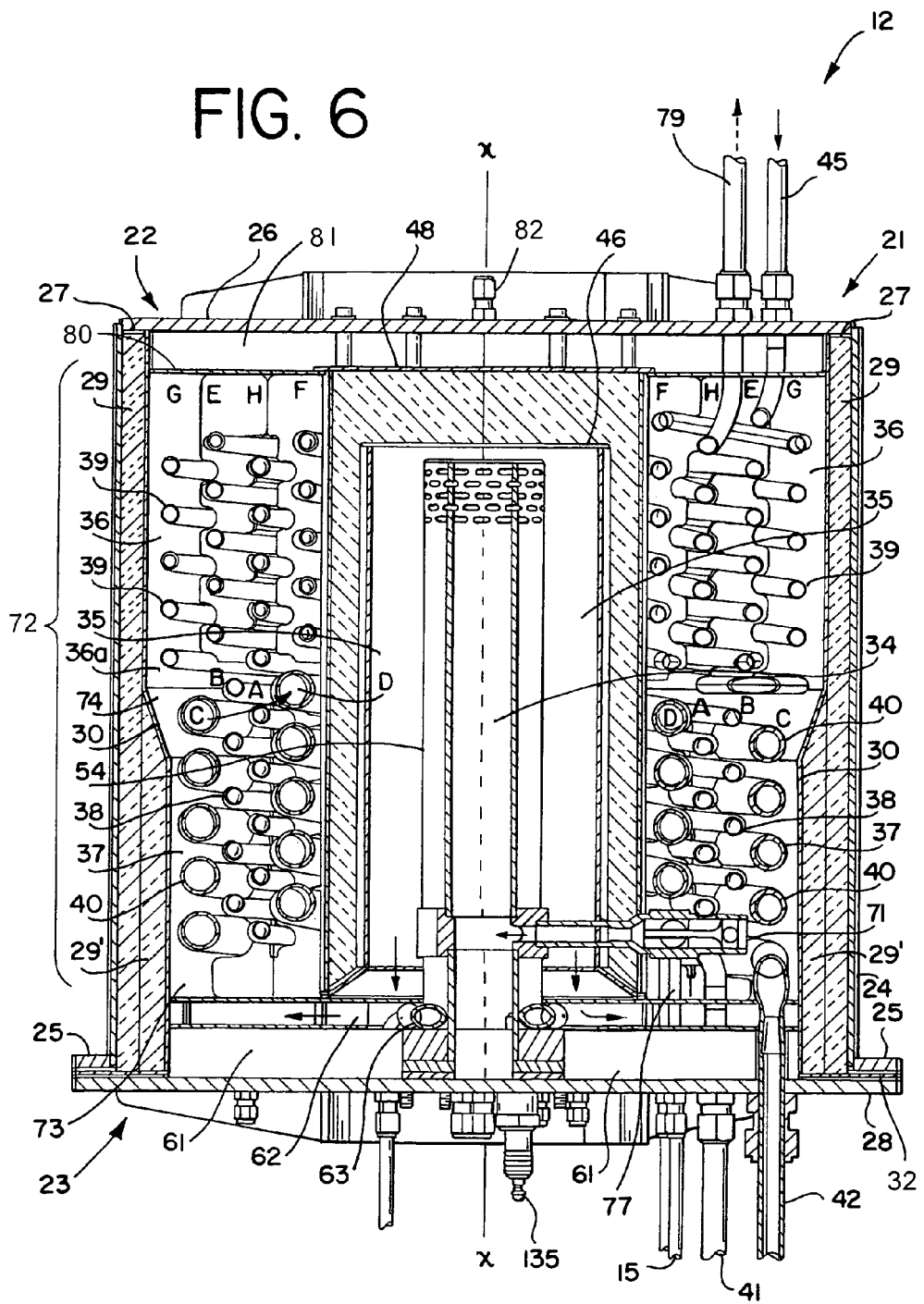
FIG. 6 is a side cross-sectional view of the reformer reactor shown in FIG. 3.

FIG. 5 discloses that the inner protective sleeve 30 preferably includes an integral flange 32. As shown in FIG. 6, the flange 32 is sized to have a diameter sufficient to under lap flange 25 of the outer cylinder 24. Bottom plate 28 attaches to the opposite axial end of the cylinder 24. The flange 32 passes beneath the insulation sleeves 30 to the pressure cylinder 24 where it is sandwiched between the outer cylinder flange 25 and the bottom plate 28. Several bolts are used to secure the three layers tightly together. Gasketing material may also be utilized to effect or assist sealing. This provides a secure seal against reformate infiltrating into the space between the sleeve 30 and the cylinder 24 and maintains the integrity of the thermal insulation 29.

The protective sleeve 30, as employed with reformer 12, has two sections of different diameters. As shown in FIGS. 5 and 6, a top portion of the protective sleeve 30 has a larger diameter than the bottom portion. The purpose of this smaller diameter portion is to provide a greater space between the inner protective sleeve 30 and the pressure containing cylinder 21 so that additional insulation 29 can be accommodated adjacent the HTS bed 37 of the reformer 12.

The bottom flange 32, is preferably configured to extend radially outwardly (FIG. 5), but may be configured to extend radially inwardly (not shown). A suitable seal may also be formed by a channel (not shown) defined in the plate 26. The flange 32 of sleeve 30 preferably forms a complete ring about the protective shell (FIG. 5), but may be discontinuous for some applications (not shown). The purpose is to provide a structurally sound connection and a seal against fluid flow.

The thermal insulation rings 29, 29' facilitate retention of heat within the reformer 12 during operation. The rings 29, 29' may be comprised of any suitable insulative material known to those skilled in the art, and may be provided in a pre-formed shape as disclosed in FIG. 5, such as a foam, rolled sheet. However, pellets or granules, fiber blanket, or other desired form may be suitable.

All of the necessary inlets and outlets—each of which will be discussed below—are provided for within the top plate 26 and bottom plate 28, as shown in FIGS. 3–6.

Figure 25:
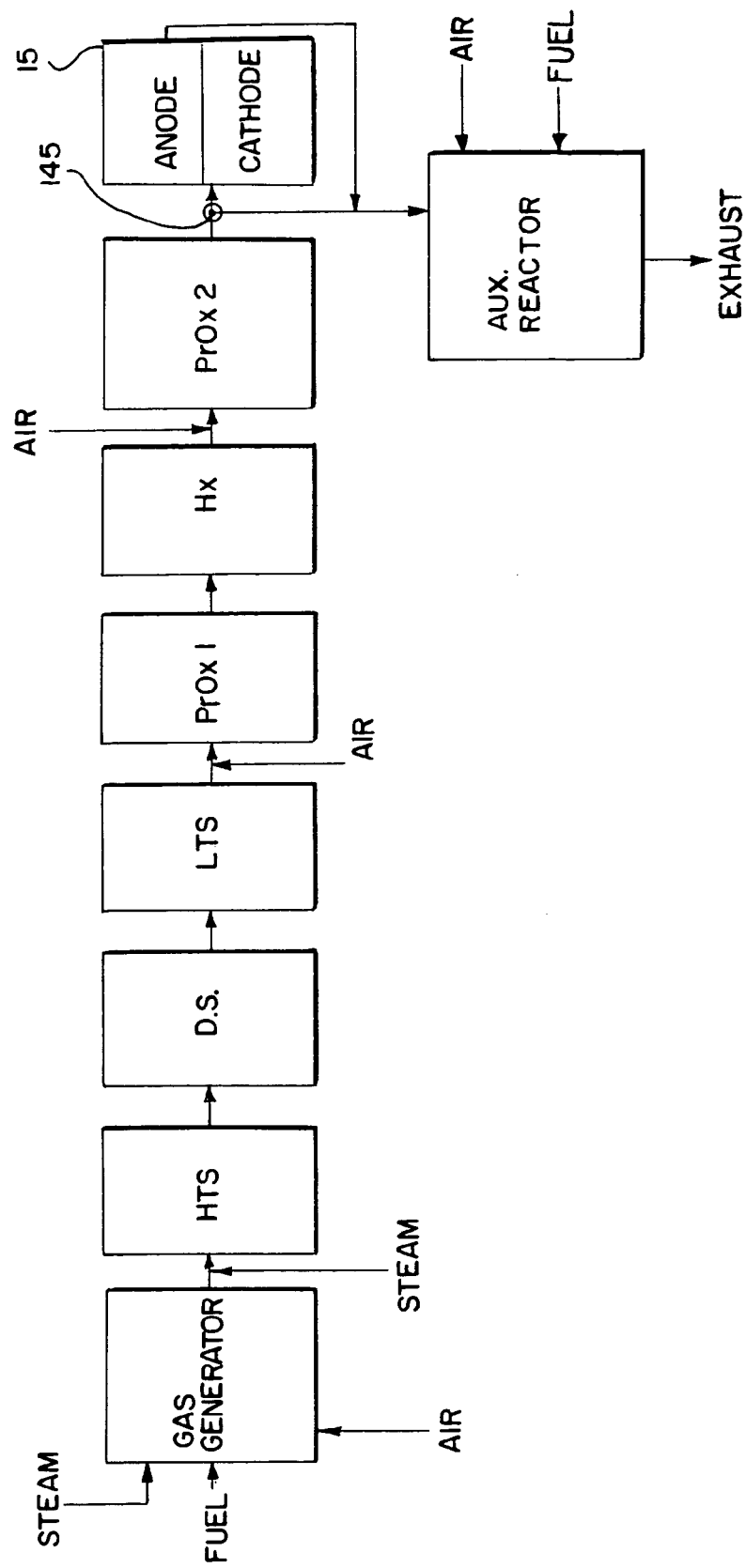
FIG. 25 is a diagrammatic illustration of a reformate flow through a system according to the present invention.

Located within the inner protective sleeve 30 of reformer reactor 12 (as disclosed in FIGS. 2 and 6), are structures to provided four distinct reaction zones or chambers: a partial oxidation ("POx") zone or chamber 34, a steam reforming zone 35, a low temperature shift (LTS) bed or zone 36 (filled with catalyst), and a high temperature shift (HTS) bed or zone 37 (filled with catalyst). A helical preheat tube 38 for steam/fuel, a helical water/steam tube 39, and a helical oxygen/air tube 40 are disposed within the LTS and HTS beds, 36 and 37, respectively. A fuel inlet 41 on plate 28 is provided to communicate with fuel conduit 17, for transferring heated fuel from the auxiliary reactor 14 to the helical fuel tube 38. An inlet 42 disposed in the bottom plate 28 of the reformer reactor 12 delivers a supply of oxygen-containing gas to the helical oxygen/air tube 40 from an oxygen gas source 43. A water/steam line 44 delivers a supply of two-phase water to water inlet 45, which in turn transfers the fluid to the water/steam helical tube 39. Finally, disposed in the top plate 26 of the reformer reactor 12 is a reformate outlet which discharges the reformate through a reformate conduit 20, preferably into a preferential oxidation reactor 13, as illustrated by FIG. 25.

The POx chamber 34 and steam reforming zone 35 together define an autothermal reforming vessel 46. The autothermal reforming vessel 46 is shown in an exploded view in FIG. 7. The outermost bounds of the autothermal reforming vessel 46 are defined by a second closed cylindrical chamber 47 having a sidewall 51 closed at its axial top end by a top plate 52 welded thereon. The sidewall 51 of the second cylindrical chamber 47 is preferably skirted, as shown in FIG. 7. A second insulation layer 48 surrounds the chamber 47 and may be made of any conventional insulative material known to those skilled in the art.

A third cylindrical wall 49 is provided around the second insulation layer 48. The third cylindrical wall 49 is closed at its upper axial end by a top plate 50. Several bolt cylinders 53 are attached to the top plate 50 to permit attachment to the top plate 26 of the cylinder 24.

The POx chamber 34 of the autothermal reforming vessel 46 may be charged with a catalyst and operated to perform catalytic POx reactions. It is preferably operated without a catalyst to conduct gas-phase flame-type partial oxidation reactions. Referring back to FIG. 6, it can be seen that the POx chamber 34 is also generally defined by a cylindrical tube 54 which acts to separate the two reforming zones while providing radiant heat transfer from the POx chamber 34 to the steam reforming zone 35 through the metal walls of cylinder tube 54. The cylindrical tube 54 has a central axis preferably coincident with the longitudinal axis (x) of the reformer reactor 12.

Referring to FIG. 8, the POx chamber 34 is seen in exploded view as three annular sections: a base section 55, an inlet section 56, and the cylindrical tube 54. The tube 54 has a first end 57 where preheated fuel mixture enters via an inlet 58 disposed within the inlet section 56, and a closed ventilated end 59 having a plurality of apertures 60 to allow the partially reformed gas to flow radially into a the first end of the steam reforming zone 35.

The steam reforming zone 35 is also cylindrical and disposed annularly about the POx chamber 34 and extending substantially the entire length of the POx chamber 34. The steam reforming zone 35 in the present embodiment is packed with a nickel containing catalyst, but may include cobalt, platinum, palladium, rhodium, ruthenium, iridium, and a support such as magnesia, magnesium aluminate, alumina, silica, zirconia, singly or in combination. Alternatively, the steam reforming catalyst can be a single metal, such as nickel, or a noble metal supported on a refractory carrier like magnesia, magnesium aluminate, alumina, silica, or zirconia, singly or in combination, promoted by an alkali metal like potassium. At a second end of the steam reforming zone 35, where the reformate stream is discharged to a transition compartment 61, a screen 62 is provided to support the catalyst bed. Within the transition compartment 61 a steam ring 63 is disposed. The steam ring 63, an alternate embodiment of which is shown in FIG. 9, is annularly disposed about the base section 55 of the POx chamber 34. A plurality of interspersed orifices 64 are disposed about the steam ring 63 for discharging steam into the reformate stream. The steam ring 63 is preferably triangular in cross section. Advantageously, this configuration permits the ring 63 to share a side with the base section 55. The exposed side 65 of the ring 63 also advantageously deflects the reformate flow outward from the longitudinal axis (x) of the reformer 12. The shared side of the triangular steam ring 63 facilitates secure attachment to the base section 55 of the POx chamber 34. However, a rectangular or square cross section may provide similar results, and a circular or oval cross section might also be suitable, albeit more difficult to attach without the benefit of a shared side. The steam ring 63 is preferably coupled to a steam delivery tube which in turn is attached to a steam source such as a steam generator or steam separator (not shown).

The inlet assembly 56 of the POx chamber 34 is preferably replaceable and is seated on the base section 55 supporting the cylindrical tube 54 of the POx chamber 34 within the autothermal reforming vessel 46. Referring to FIG. 10, the inlet section 56 is generally a disk-like structure having a substantially centered opening 67 defined by a cylindrical inner wall 68 which aligns with the inner wall of the POx chamber 34 when assembled. The outer circumference of the inlet section 56 in the preferred embodiment is squared on one side and rounded on the opposite side. A bore 69 through the inlet section 56 can be seen in FIG. 10. The bore 69 extends from the squared side of the inlet section 56 proximate a corner thereof and then inward to intersect the cylindrical inner wall 68 tangentially. Referring to FIG. 11, inserted within the bore 69 is an inlet tube 70. The inlet tube is oriented perpendicular to the surface of the squared side. One end of the inlet tube 70 may be affixed within the bore 69 and an opposite end is coupled to a mixing manifold 71. This provides a secure attachment of the inlet tube 70 as opposed to prior art delivery tubes which may attempt to directly attach to the cylindrical wall of the POx chamber. The exact shaping of the end of the delivery tube is rendered unnecessary since the bore 69 of the present invention is unitary to the replaceable inlet section. A replaceable, less-expensive, easier-to-construct tangential delivery port to the POx chamber 34 is thus established by this configuration.

As illustrated in FIG. 6, disposed annularly about the autothermal reforming vessel 46 is the shift reaction zone 72, including two shift reaction beds, the HTS bed 37 and the LTS bed 36. Optionally, a desulfurizing bed catalyst may be added as well. The HTS bed 37, as shown in FIG. 6, spans approximately one-half the length of the shift reaction zone. 72. An input side 73 of the HTS bed 37 is disposed adjacent the transition compartment 61 for receiving the reformate stream. An outlet side 74 of the HTS bed 37 is abutted to an inlet end 36a of the LTS bed 36 for discharging shift-reacted constituents from the HTS bed 37. The HTS bed 37 is preferably packed with a conventional high-temperature shift catalyst, including transition metal oxides, such as ferric oxide (Fe2O3) and chromic oxide (Cr2O3). Other types of high temperature shift catalysts include iron oxide and chromium oxide promoted with copper, iron silicide, supported platinum, supported palladium, and other supported platinum group metals, singly and in combination. These catalyst may be provided in several of the forms mentioned previously.

According to one aspect of the invention, the HTS catalyst bed is actively cooled. This active cooling is provided to prevent temperatures from rising in the zone to the point of damaging the catalyst. Cooling is advantageously accomplished by heat exchange with reactants flowing through tubes placed in the HTS zone. To effect good heat transfer, the catalyst is preferably in the form of granules, beads, etc., so as to pack closely to the heat transfer tubes. However, one or more monolithic catalyst could also be employed in the HTS zone if appropriately configured to coexist with a heat exchanger.

The heat transfer tubes are configured through the annular HTS zone as shown in FIG. 6. The helical fuel tube 38 forms a part of fuel line 17. The plurality of coils of the cooling/fuel preheat tube 38 are arranged co-axially, centered substantially about the longitudinal axis (x) of the reformer reactor 12. Heated fuel (or a fuel and steam mixture) is carried through the HTS bed 37 within the inner helical coils (A) of fuel tube 38 and then reaching one end reverses back through the HTS bed 37 within the outer helical coils (B) until it arrives at a mixing chamber 76 of the mixing manifold 71 (FIG. 11).

A secondary preheated fuel line 77 is preferably connected directly to the mixing manifold 71 for start-up conditions. This direct preheated fuel feed can be disrupted as soon as the primary fuel source is properly heated and desulfurized, if necessary.

Also coiled within the HTS bed 37 is the helical oxygen/air tube 40. The oxygen/air tube 40 is comprised of a plurality of coils beginning with a first coil attached to oxygen/air inlet 42. The coils are arranged such that a first outer set (C) run upward through the HTS bed 37 before transitioning into an inner set of coils (D) which run downward through the HTS bed 37. Variations of this, as well as other coil arrangements, too numerous to discuss in this disclosure, are certainly possible without departing from the intended scope of the present invention. The oxygen/air tube 40 and the helical fuel tube 38 converge just prior to the mixing chamber 76, as shown in FIG. 11, of the mixing manifold 71. The two converged tubes are preferably coaxial as shown. This coaxial configuration allows the fluid with the higher flow velocity to assist the fluid flow of the lower flow velocity. The mixing chamber 76 then directs the fluids of the converged lines as a homogenous mixture into the inlet tube 70 toward the POx chamber 34.

The LTS bed 36 begins at its inlet end 36a proximate the outlet side of the HTS bed 37. The LTS bed 36 comprises the remainder of the shift reaction zone 72. A suitable low-temperature shift catalyst, such as $Cu/ZnO_2$, is packed, preferably as granules, beads, or the like, within the LTS bed 36. A helical two-phase water tube 39 is disposed within the LTS bed 36 in a heat transfer relationship (see System and Sub-System Control and Operation below) and comprises a plurality of coiled sections. The plurality of coils of the helical water tube 39 are preferably co-axial with one another about the longitudinal axis (x) of the reformer reactor 12. FIG. 6 illustrates a preferred dispersed arrangement of the helical coils of water tube 39 within the LTS bed 36 having four columns of coils. Water enters the water tube 39 at inlet 45 which itself is connected to a water source. The flow travels through the bed within coils (E), then a "U" turn directs the flow into coils (F) moving through the LTS bed 36. The flow then connects to coils (G) for a return through the bed 36 before finally another "U" turn directs the flow into coils (H) to travel back through the bed 36 a final time. The flow is discharged from the reformer reactor 12 through water/steam outlet 79.

Steam is generated by transfer of heat to the water tube 39. Preferably the tubes 39 are maintained at a sufficient pressure to accommodate a two-phase water/steam mixture. The two-phase water/steam is eventually discharged to a steam separator where it may be separated into liquid and gaseous (steam) portions and made available for use by other components of the system 10.

A screen 80 is positioned at the discharge end of the LTS bed 36. The screen 80 provides a barrier for the catalyst while still permitting reformate to flow into the open collection chamber 81 of the reformer reactor 12. A single reformate outlet 82 is positioned at the approximate center of the reactor top surface 22 providing fluid communication with a transfer conduit 20. The transfer conduit 20 directs the reformate flow into the PrOx reactor 13.

B. PrOx Reactor

Referring to the drawings of FIGS. 12–19, a reactor for preferentially oxidizing carbon monoxide to carbon dioxide in a hydrogen-rich reformate stream, designated generally as reactor 13, is shown. The reactor 13 is designed to direct a radial flow of hydrogen-rich reformate through a catalyst bed. The reactor 13, as shown in FIG. 12, includes an outer body 83 having protective covering, preferably formed of stainless steel. At one end of the body 83 is a reformate inlet 84, and at the other end is a reformate outlet 85. Additionally, a steam/water inlet 86 and a steam/water outlet 87 are provided for heat exchange purposes (see System and Sub-System Control and Operation below). Optionally, air inlets (not shown) may be provided to permit reaction air to be diffused within critical areas of the reactor 13. The steam coil allows for substantial isothermal PrOx quality.

Within the reactor 13 of the present embodiment, shown in FIG. 13, a flow diffuser 88 is immediately in-line with the reformate inlet 84. The flow diffuser 88 is comprised of a collection chamber 89 having a discharge end 90 proximate a central manifold 91. The discharge end 90 of the flow diffuser 88 has a plurality of apertures for the discharge of reformate into the central manifold 91. Numerous alternate embodiments of the flow diffuser are possible without departing from the intended scope of the present invention.

The central manifold 91, which may be referred to as a first zone, of the reactor 13 is defined by a first cylindrical wall 92, preferably of a screen design having multiple openings disposed about the circumference and length of the wall 92, closed off at one end 93 opposite the flow diffuser 88. Annularly arranged about the central manifold 91 is a second zone packed with a suitable catalyst in the proper form. The second zone 94, as shown in the top cross-sectional view of FIG. 14, is also preferably cylindrical, but may be of any shape complementary to the shape of the central manifold 91. The second zone 94, in the present embodiment, is packed with a suitable catalyst—either loosely or tightly—to form a catalyst bed 95. By "suitable" it is meant a catalyst which selectively oxidizes carbon monoxide to carbon dioxide over diatomic hydrogen, though some oxidation of the hydrogen is inevitably acceptable. The catalyst may be prepared by any of the methods known to those skilled in the relevant art. While several catalyst exist which may be used with the present reactor 13, a couple of preferred suitable catalyst include $Pt/\gamma-Al_2O_3$ and $Au/\alpha-Fe_2O_3$.

A second cylindrical wall 96, also preferably of a screen design having multiple openings disposed about the circumference and length of the wall 96, defines an outer edge of the catalyst bed 95. The two cylindrical walls, 92 and 96, may also be spherical or hemispherical in shape as alternate embodiments. A helical steam/water or boiler tube 97 is arranged within the catalyst bed 95 to substantially traverse the bed 95 and provide a heat transfer relationship with the catalyst material. In accordance with this relationship, the packed catalyst preferably maintains contact with the boiler tube 97. Beginning at a steam/water inlet 86 the helical tube 97 progresses in a first direction (arrow A) through the catalyst bed 95 of the second zone 94 and, upon reaching the closed end 93, retreats in a second opposite direction (arrow B) through the catalyst bed 95 to the steam outlet 87.

An annular discharge channel 99 is defined between the second cylindrical wall 96 and an inside surface of the body 83 of the reactor 13. The discharge channel 99 opens into a discharge area 100 at an end of the reactor 13 proximate the reformate outlet 85.

Figure 15:
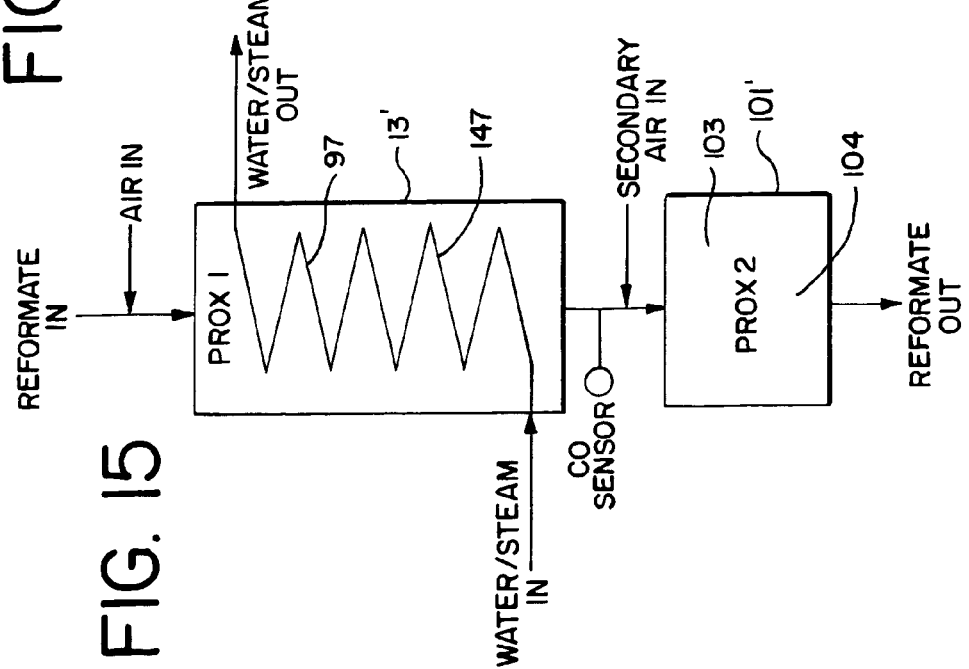
FIG. 15 is a diagrammatic illustration of a two stage PrOx reactor embodiment of the present invention.

In another embodiment of the present invention, the preferential oxidation of carbon monoxide to carbon dioxide is accomplished in at least a two stage process. That is, after discharge from the PrOx reactor 13, the hydrogen-rich reformate stream may be further subjected to a second PrOx reactor 101', as illustrated in FIG. 15. The second reactor 101 has proven to be an advantageous component in "turn-down." "Turn-down" refers to the condition whereby the system operates at less than the maximum rated power. For instance, a system rated at 50 kW operating at only 25 kW is in a turn-down condition. While the second reactor 101' may be designed similar to first reactor 13, in the preferred embodiment, reactor 101' is adiabatic. This is possible because the concentration of carbon monoxide is sufficiently low that oxidation will not overheat the catalyst bed to promote undesirable reactions (2) and (3) above.

Figure 17:
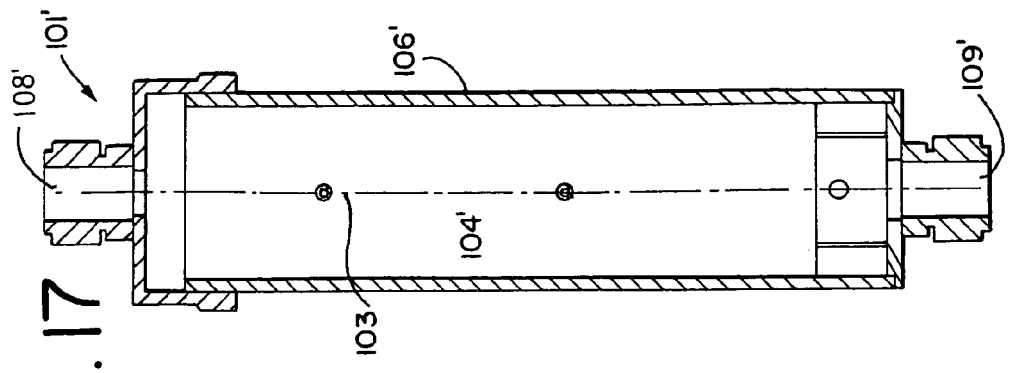
FIG. 17 is a side cross-sectional view of the embodiment of the second stage PrOx reactor shown in FIG. 16.
Figure 16:
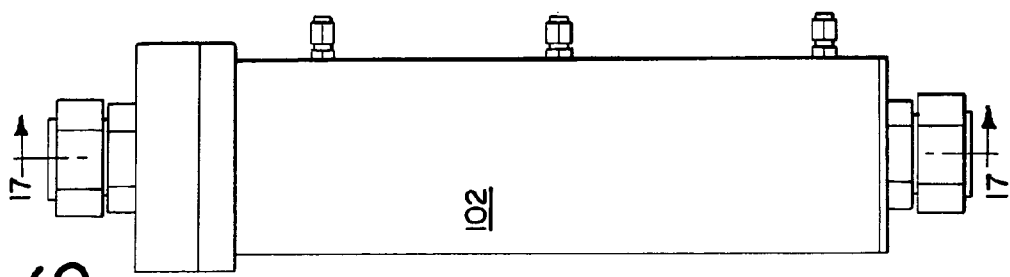
FIG. 16 is a side view of one embodiment of a second stage PrOx reactor, as shown in FIG. 15.

Referring to FIGS. 16 and 17, one embodiment of the second PrOx 101' is shown in a side view. The second PrOx 101' is preferably a cylindrical vessel having an inlet 108', an outer wall 106', and an outlet 109'. Along the vessel wall is preferably positioned three thermocouple, or other known sensor devices.

A cross-section of the second reactor 101', shown in FIG. 17, includes a monolithic catalyst 103 advantageously positioned within a single reaction zone 104'. A distinguishing aspect of the second PrOx reactor 101' over the first PrOx reactor 13 is the absence of cooling coils in the reaction zone 104'. The incoming reformate stream, with air mixture as discussed above, encounters the catalyst and begins the oxidation as shown in reaction (1) above. The resulting reformate at discharge has a concentration of carbon monoxide preferably less than 10 ppm. The second reactor 101' typically operates within the temperature range of from about 250° F. to about 500° F.

Figure 19:
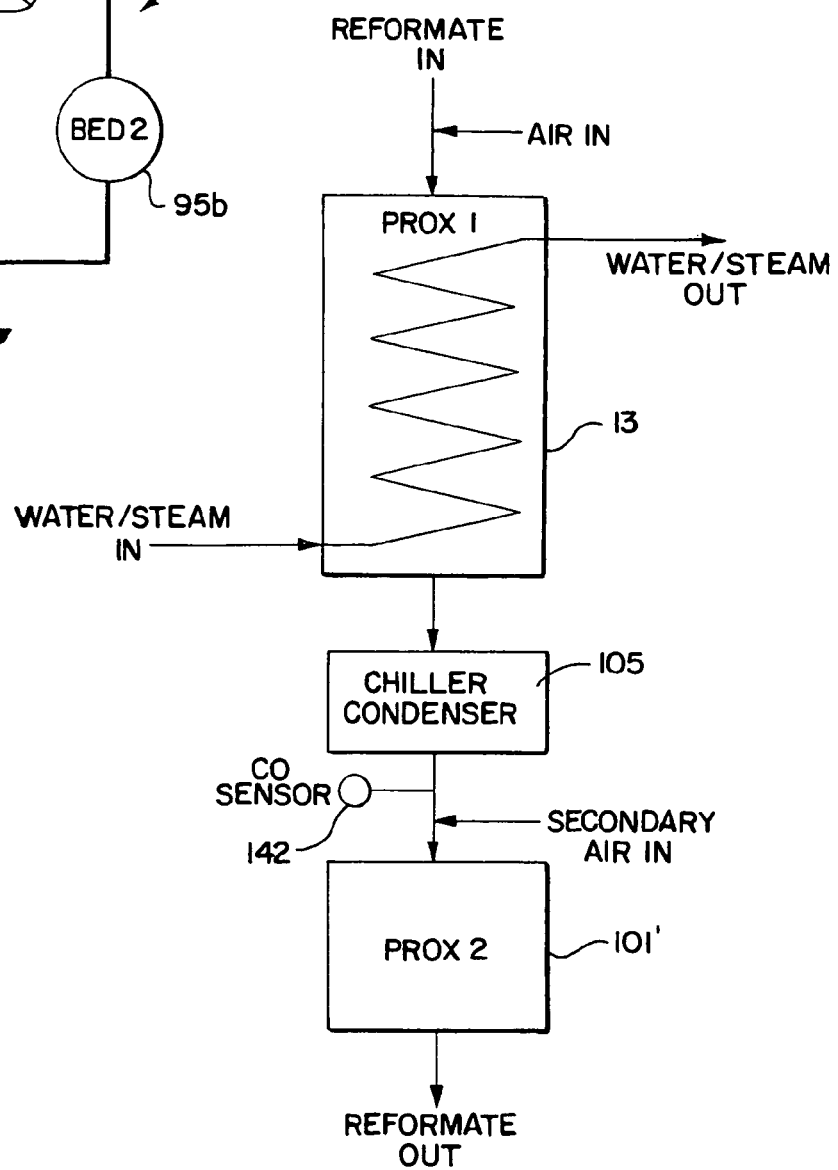
FIG. 19 is a diagrammatic illustration of a two-stage PrOx arrangement having a chiller condenser in line.

In another alternative preferred embodiment of the PrOx reactor stage of the system 10, a chiller condenser 105 may be integrated in-line between the first reactor 13 and the second reactor 101', as shown in FIG. 19. The chiller condenser 105 is preferably a fan used to significantly lower the temperature of the reformate stream after it exits the first reactor 13. The cooling of the reformate at this point avoids undesirable side reactions in the reformate, such as the reverse water-gas shift reaction. However, such cooling may also have an adverse affect on the operation of the PrOx reactor due to an increase in the relative humidity of the stream. These competing interests should be considered in the overall integrated system design.

C. Auxiliary Reactor

The auxiliary reactor 14, as illustrated in FIG. 1, is used in combination with the reformer reactor 12 and the fuel cell 15. A primary function of the preferred auxiliary reactor 14 is to operate as a tail gas combustor burning the anode exhaust gases, comprised mostly of hydrogen, discharged from the fuel cell 15. However, in conjunction with the combustion of anode gases, a unique structure of the auxiliary reactor 12 takes advantage of the excess heat created by the combustion to preheat and desulfurize unreformed fuel and steam for use in other parts of the hydrogen forming system 10, such as the reformer reactor 12.

Figure 20:
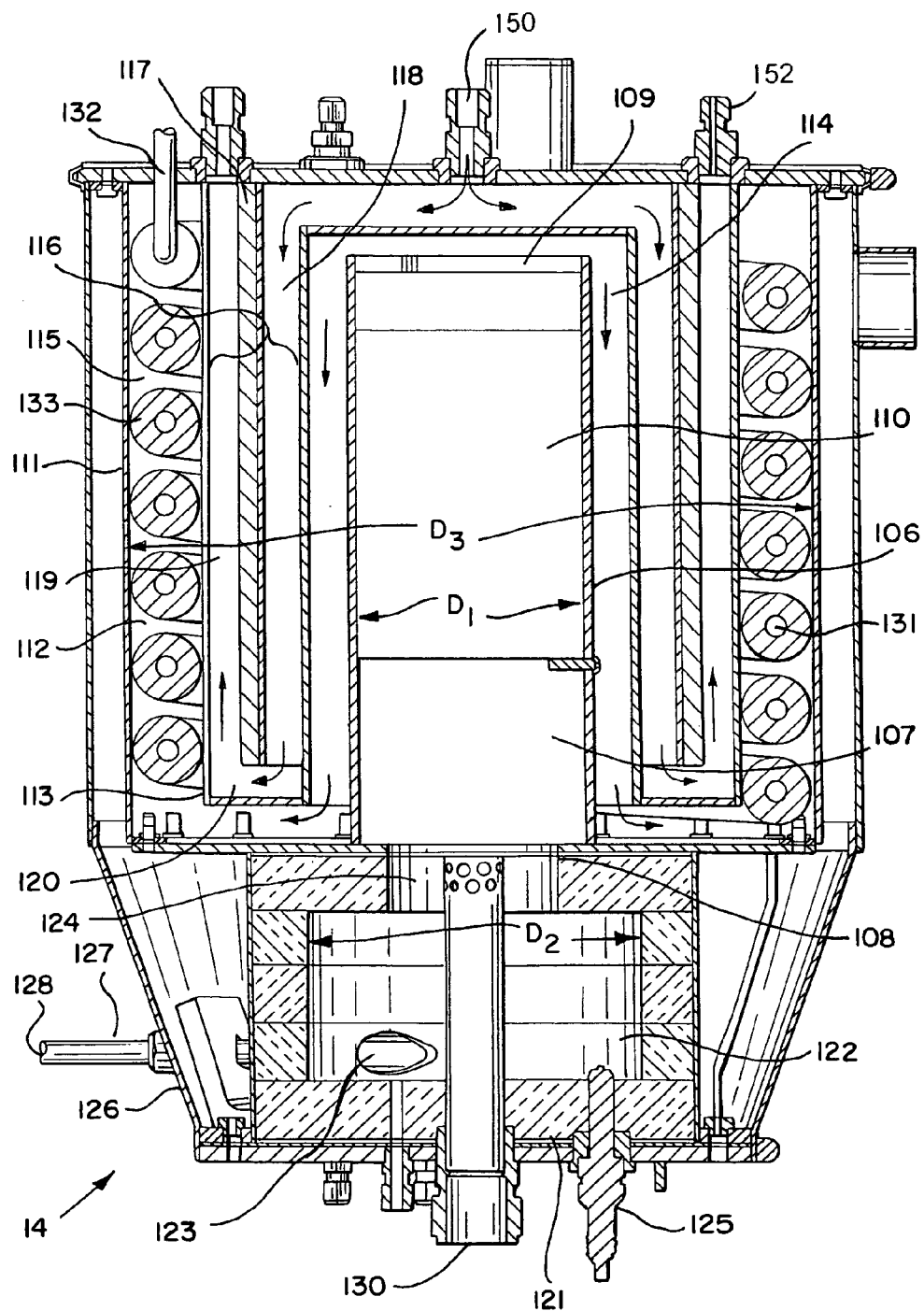
FIG. 20 is a side cross-sectional view of one embodiment of an auxiliary reactor of the present invention.

Referring to FIG. 20, the reactor 14 is preferably a cylindrical vessel having a first annular wall 106 defining a first chamber 107. The first chamber 107 has a diameter (D1), an inlet end 108 and an opposed outlet end 109. Disposed within the first chamber 107 is a suitable catalyst 110, preferably a platinum (Pt) catalyst in monolith form. The function of the catalyst 110 within the first chamber 107 is discussed in further detail below.

A second annular wall 111 surrounds the first wall 106 and provides a second chamber 112 which is annularly disposed about the first chamber 107 and has a diameter (D3). The auxiliary reactor 14 further includes a third annular wall 113 disposed between the second annular wall 111 and the first annular wall 106, the third annular wall 113 extending substantially the length of the second annular chamber 112 and effectively dividing the second annular chamber 112 into first and second annular sub-chambers 114 and 115, respectively. The first annular sub-chamber 114 being disposed between the first chamber 107 and the third annular wall 113; the second annular sub-chamber being disposed between the third annular wall 113 and the second annular wall 112.

As seen in FIG. 20, the third annular wall 113 is of a double-wall construction defining third annular chamber 116. Located within the third annular chamber is fourth annular wall 117, extending substantially the length of the third annular chamber and effectively dividing the third annular chamber into third and fourth annular sub-chambers, 118 and 119, respectively, the third annular sub-chamber 118 being disposed between the first annular sub-chamber 114 and the fourth annular wall 117; the fourth annular sub-chamber 119 being disposed between the fourth annular wall 117 and the second annular sub-chamber 115. The third and fourth annular sub-chambers, 118 and 119, respectively, define a U-shaped conduit 120 for the flow of unreformed fuel, as further explained below.

The reactor 14 additionally includes a flame-type burner assembly 121 upstream of the catalyst 110 in the first chamber 107. The burner assembly 121 is defined by a burner chamber 122, which includes a burner inlet 123 and a burner outlet 124, the burner outlet 124 being connectable to the inlet end 108 of the first chamber 107. The burner chamber 122 is generally cylindrical and is concentric with the first annular wall 106 but has a larger diameter (D2) than the diameter (D1) of the first chamber 107. The larger diameter (D2) thus restricts the flow of partially burned, heated gases from the burner chamber 122 into the first chamber 107. An ignitor 125, preferably a spark plug, is provided within the burner chamber 122 for creating a spark which ignites a fuel to create a flame at start-up.

The burner assembly 121 is provided in the present embodiment for mixing and burning a heated gas stream within the burner chamber 122. An auxiliary first fuel, for example natural gas, may be directed to the burner chamber 122 through the burner inlet 123 to form a heated gas stream. The heated gas stream is then further directed to the catalyst 110 in the first chamber 107 through the outlet 124. To improve combustion characteristics during steady-state operation, air in air conduit 127 is preheated by passing between an outer annular shell 126 and the burner chamber 122. The inlet end 128 of the air conduit 127 is connected to a source of oxygen-containing gas (not shown). The air conduit 127 directs a stream of oxygen-containing gas to the burner inlet 123 of the burner assembly 121 for combustion within the burner chamber 122. The burner inlet 123 is designed to allow for tangential delivery of the oxygen-containing gas and the auxiliary first fuel into the burner chamber 122.

The auxiliary reactor 14 further includes an inlet tube 130 that passes through the burner chamber 122 and extends directly into the first chamber 107. Preferably, the inlet tube 130 is an elongate tube which extends through the burner chamber 122 for heat exchange with the gases therein and the fuel cell exhaust gases flowing within the inlet tube 130.

Included within the second annular sub-chamber 115 is a helical tube 131 that extends the length of the second annular sub-chamber 115. The helical tube 131 is configured to allow for the flow of water, as discussed in more detail below. The helical tube 131 is connected to the water/steam line of the reformer 12 via conduit 132 to provide the water/steam needed for the LTS bed 36 of the reformer 12 (see FIG. 23). Where a more compact reactor design is required, a plurality of fins 133, preferably comprised of copper, are spaced in predefined intervals throughout the length of the helical tube 131. The fins 133 radially extend from the circumference of the helical tube 131 to enhance the exchange of heat between the heated exhaust gas stream and the water within the helical tube 131.

Figure 21:
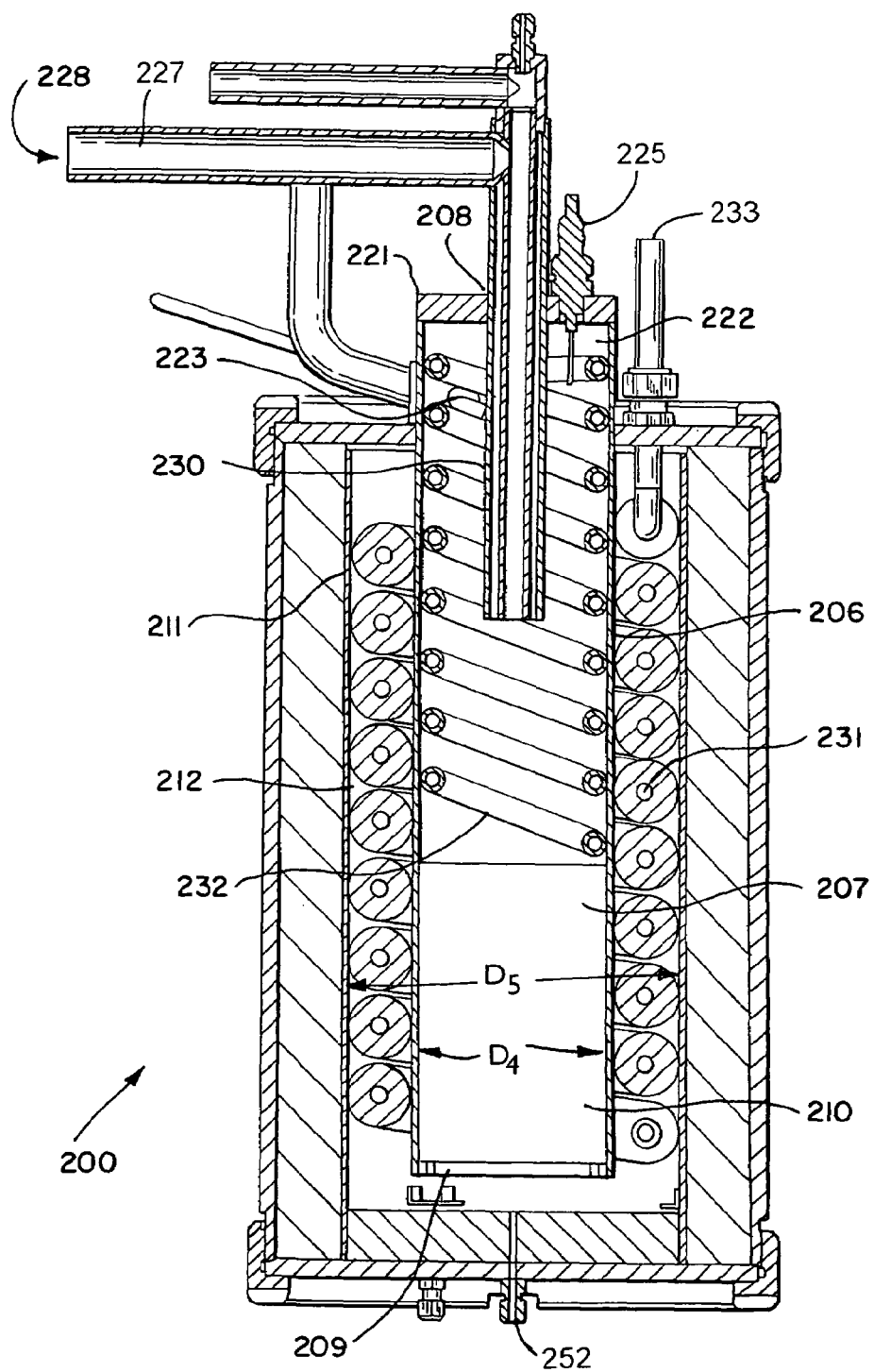
FIG. 21 is a side cross-sectional view of an alternative embodiment of an auxiliary reactor of the present invention.

A second preferred embodiment of the auxiliary reactor, as shown in FIG. 21, is used preferably for reformers designed to reform a liquid hydrocarbon fuel, such as gasoline or ethanol, as opposed to natural gas or propane. The reactor 200 is preferably a cylindrical vessel having a first annular wall 206 defining a first chamber 207. The first chamber 207 has a diameter (D4), an inlet end 208 and an opposed outlet end 209. Disposed within the first chamber 207 is a catalyst 210, preferably a platinum (Pt) catalyst in monolith form, for burning fuel cell exhaust to create a heated auxiliary reactor gas stream. The catalyst 210 within the first chamber 207 is discussed in further detail below.

A second annular outer wall 211 surrounds the first wall 206 and provides a second annular chamber 212 having a diameter (D5). Located within the second annular chamber 212 is a first helical coil 231 extending approximately the length of the second annular chamber 212. Additionally, a second helical coil 232 is located within the first annular chamber upstream of the platinum (PT) catalyst monolith 210. Both the first and second helical coils 231 and 232 are adapted to allow for the flow of a two-phase water/steam mixture therethrough.

The reactor 200 additionally includes a flame-type burner assembly 221 upstream of the catalyst 210 in the first chamber 207. The burner assembly 221 is defined by a burner chamber 222 at one end of the first chamber 207. Fuel and air are supplied to the burner chamber 222 via burner inlet 223 and air conduit 227, respectively. An ignitor 225, preferably a spark plug, is provided within the burner chamber 222 for creating a spark to ignite the fuel and create a flame at start-up.

The burner assembly 221 is designed for mixing and burning a heated gas stream within the burner chamber 222. An auxiliary first fuel, in this instance gasoline, may be directed to the burner chamber 222 through inlet 223 to form a heated gas stream and the heated gas stream is then further directed to the catalyst 210 in the first chamber 207. The inlet end 228 of the air conduit 227 is connected to a source of oxygen-containing gas (see FIG. 2 for example). The air conduit 227 directs a stream of oxygen-containing gas to the burner inlet 223 of the burner assembly 221 for combustion within the burner chamber 222. The burner inlet 223 is designed to allow for tangential delivery of the oxygen-containing gas and the auxiliary first fuel into the burner chamber 222.

The auxiliary reactor 200 further includes an inlet tube 230 that passes through the burner chamber 222 and extends to the exit of the burner 222. Preferably, the inlet tube 230 is an elongate tube which extends through the burner chamber 222 for heat exchange between the gases therein and the fuel cell exhaust gases flowing within the inlet tube 230.

Figure 22:
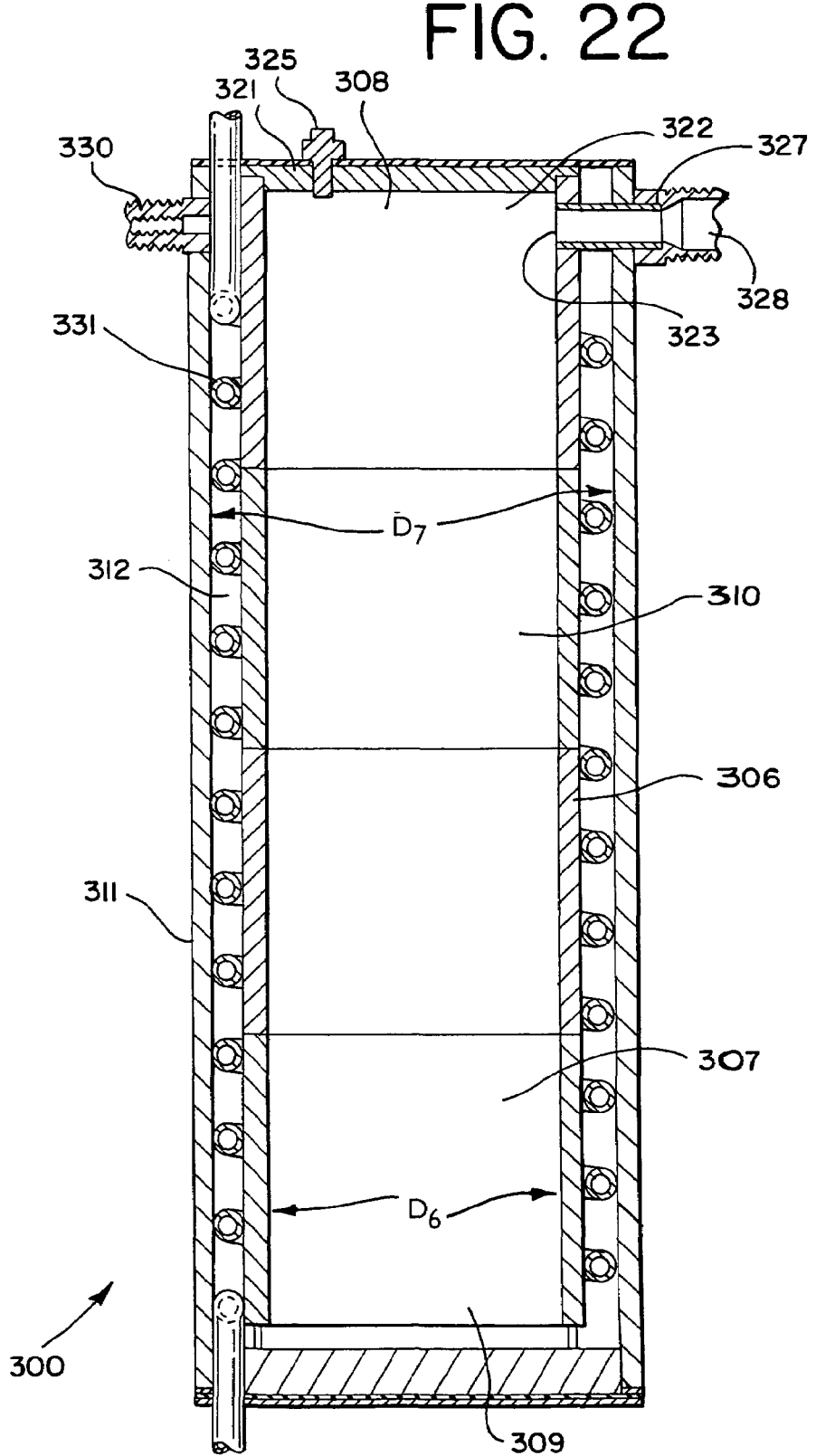
FIG. 22 is a side cross-sectional view of another alternative embodiment of an auxiliary reactor of the present invention.

A third preferred embodiment of the auxiliary reactor, as shown in FIG. 22, is used mainly for reformers designed to reform, for instance, natural gas. The reactor 300 is preferably a cylindrical vessel having a first annular wall 306 defining a first chamber 307. The first chamber 307 has a diameter (D6), an inlet end 308 and an opposed outlet end 309. A reaction zone 310 is provided within the first chamber 307.

A second annular outer wall 311 surrounds the first wall 306 and provides a second annular chamber 312 having a diameter (D7). Located within the second annular chamber 312 is a helical coil 331 extending approximately the length of the second annular chamber 312. The helical coil 331 is adapted to allow for the flow of a two-phase water/steam mixture therethrough.

The reactor 300 additionally includes a flame-type burner assembly 321 upstream of the reaction zone in the first chamber 307. The burner assembly 321 is defined by a burner chamber 322 at one end of the first chamber 307. Fuel and air are supplied to the burner chamber 322 via burner inlet 323 and air conduit 327, respectively. An ignitor 325, preferably a spark plug, is provided within the burner chamber 322 for creating a spark to ignite the fuel and create a flame under start-up conditions.

The burner assembly 321 is designed for mixing and burning a heated gas stream within the burner chamber 322. An auxiliary first fuel, natural gas, is directed to the burner chamber 322 through inlet 323 to form a heated gas stream and the heated gas stream is then further directed to the reaction chamber 310 in first chamber 307. The inlet end 328 of the air conduit 327 is connected to a source of oxygen-containing gas (see FIG. 2, for example). The air conduit 327 directs a stream of oxygen-containing gas to the burner inlet 323 of the burner assembly 321 for combustion within the burner chamber 322. The burner inlet 323 is designed to allow for tangential delivery of the oxygen-containing gas and the auxiliary first fuel into the burner chamber 322.

The auxiliary reactor 300 may further include an inlet tube (not shown) that extends directly into the first chamber 307. Preferably, the inlet tube is an elongate tube which extends through the burner chamber 322 for heat exchange between the gases therein and the fuel cell exhaust gases flowing within the inlet tube.

II. System and Sub-System Control and Operation

While some of the system controls and operations have been alluded to in the preceding disclosure, this section of the disclosure is specifically directed to explaining the preferred operation and means for such control. The control hardware for each subsystem, i.e., the reformer 12, the PrOx reactor 13, and the auxiliary reactor 14, is discussed, including start-up, steady state, and transient conditions. Modifications to the specific controls may be necessary based upon the characteristics of the actual hydrogen forming system and its operation.

A. Water/Steam Loop

Figure 23:
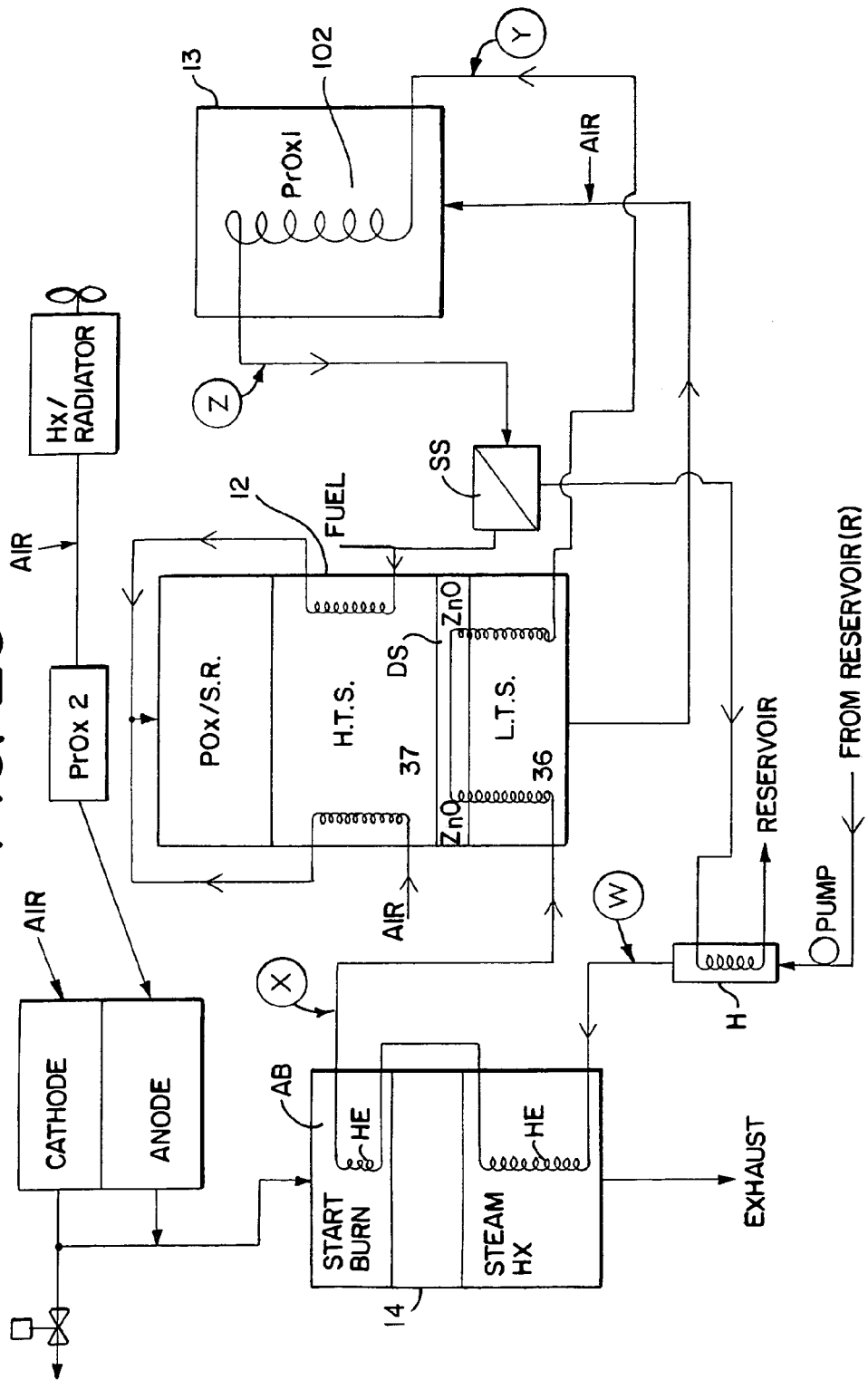
FIG. 23 is a diagrammatic illustration of a water/steam loop and water/steam controls of the present invention.

With reference to FIG. 23, the important water/steam cooling loop can be more readily understood. A reservoir (R) supplies water to the system 10 through a pump (P). The water is heated at heat exchanger (H) to produce two-phase water/steam mixture at point "A". The pressure at point "W" of the loop is preferably maintained at about 150 psi with an initial temperature of about 100° C.

The loop runs through a heat exchange section of the auxiliary burner assembly (FPA) to provide cooled exhaust gases. A second pass is made through the anode gas burn section of the auxiliary reactor 14 in order to bring the temperature of the water/steam mixture to about 185° C. at point "X" in steady state operation. The loop is then routed to the fuel reformer 12.

The water/steam mixture enters a low temperature shift catalyst bed 36 of the fuel reformer 12 first. Heat exchange with the catalyst is carried out as previously discussed to control the temperature of the bed. Optionally, the loop may pass through the desulfurizing bed (DS) between passes through the LTS bed 36, as shown in FIG. 23.

Leaving the LTS bed 36 the water/steam mixture at point "Y" is usually about 185° C. and about 100–150 psi. The loop enters a first PrOx reactor 13 as an active cooling means for the catalyst bed 102. Exiting the PrOx reactor 13 the water/steam mixture is preferably maintained at 185° C. at point "Z." The water/steam mixture enters a steam separator (SS) before returning water to the water reservoir (R) and steam to reformer 12.

Alternatively, the FPA and PrOx steam loop positions may be switched, depending on which bed is more important to heat quickly during start-up. Generally, the FPA is first, as shown in FIG. 23.

B. Control Points

Figure 24:
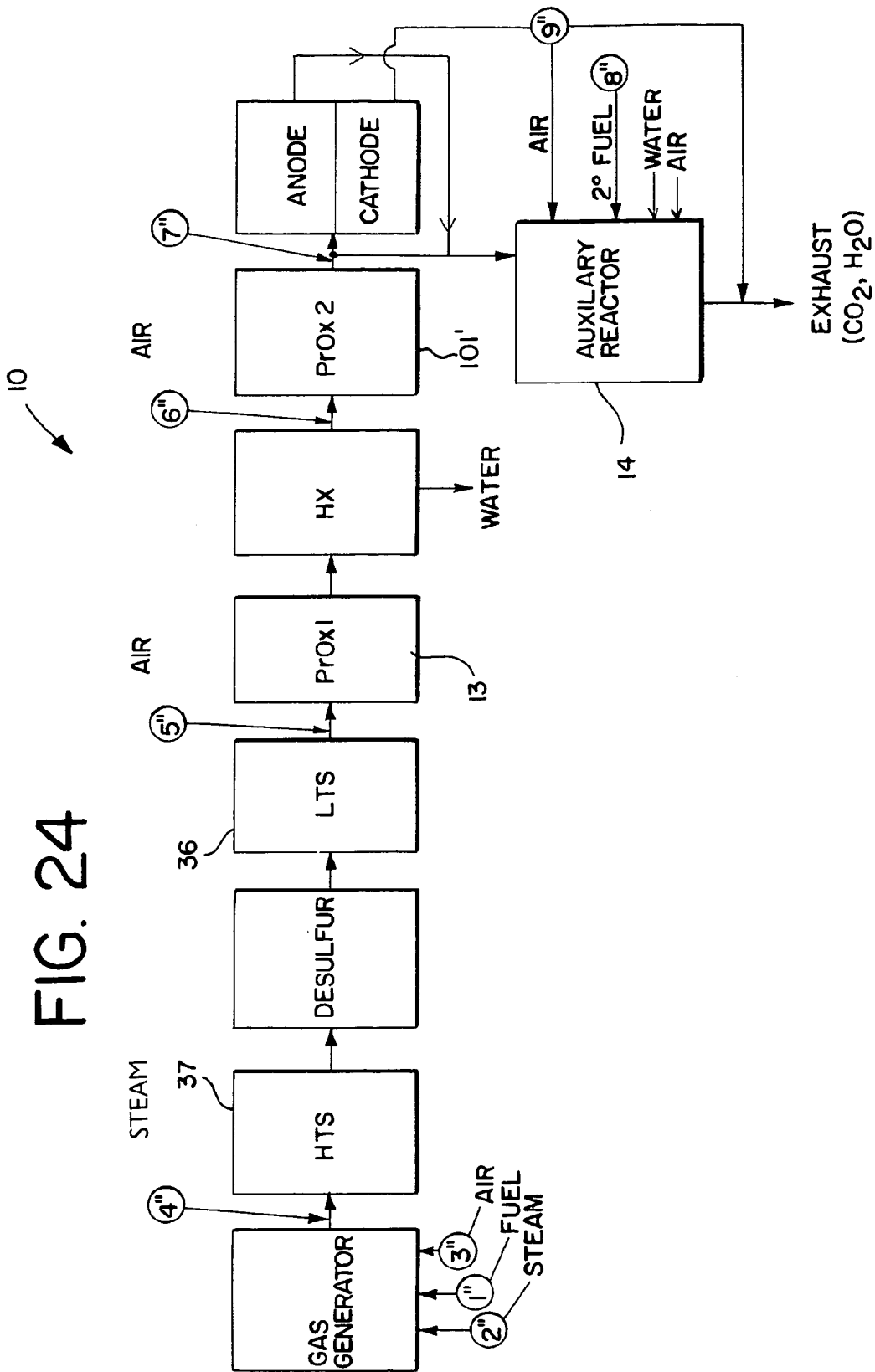
FIG. 24 is a diagrammatic illustration of one embodiment of the present invention showing operational control points.

FIG. 24 illustrates various control points for an exemplary embodiment of the present invention (double prime notation is used for each of the discussed points). Additionally, the system pressure is also used to co-regulate several of the disclosed processes, such as the water/steam loop.

A fuel valve 1" is used for the primary fuel control. The fuel valve 1" allows control of the fuel rate as one means of providing hydrogen on demand. A water/steam valve 2" and an air valve 3" are used at the reformer 12 to control the ratios of steam, air, and fuel. This helps to maintain the reformer chamber temperature for proper reformation. It is possible to provide two inlet streams (e.g., air/fuel to the POx chamber, or water/fuel to the steam reformer chamber) if necessary.

A steam control 4" is used to provide enough steam to complete the water gas shift, as previously discussed. Another air valve 5" is positioned prior to the inlet of the first PrOx reactor 13. This valve 5" provides control over the theoretical/calculated air delivered to oxidize carbon monoxide in the reformate stream to carbon dioxide. A third air valve 6" is positioned prior to the inlet of the second PrOx reactor 101'. As will be further explained, regulation of air at this point provides additional air to the PrOx chamber to complete the oxidation of carbon monoxide during such conditions as start-up, shut-down, and transients.

A routing valve 7" is used to divert reformate having an excess of carbon monoxide to the auxiliary reactor 14 where it can be burned off. This is typical at start-up. As soon as the carbon monoxide concentration reaches acceptable levels the reformate can be routed by the valve 7" to the fuel cell 15. Another start-up control point is control 8". Control 8" is used to provide a secondary fuel to the system on initial warm-up, usually with excess air as well. The secondary fuel is run through the auxiliary reactor 14 before routing to the reformer 12.

The final control point is valve 9" which is used to route a portion of the cathode exhaust to the auxiliary reactor. The remaining portion of the cathode exhaust is fed to an exhaust outlet or conduit.

Each of the disclosed control points is operated by a central processing system (not shown). The system operates via a program capable of adjusting the operating parameters of the fuel cell system through periodic or continuous feedback data from sensors mechanisms or the like. The data is processed and the system operates the appropriate control point in response to the rapidly changing conditions experienced during and transitioning through start-up, steady-state, transients, and shut-down.

C. Fuel Preheat

Figure 26:
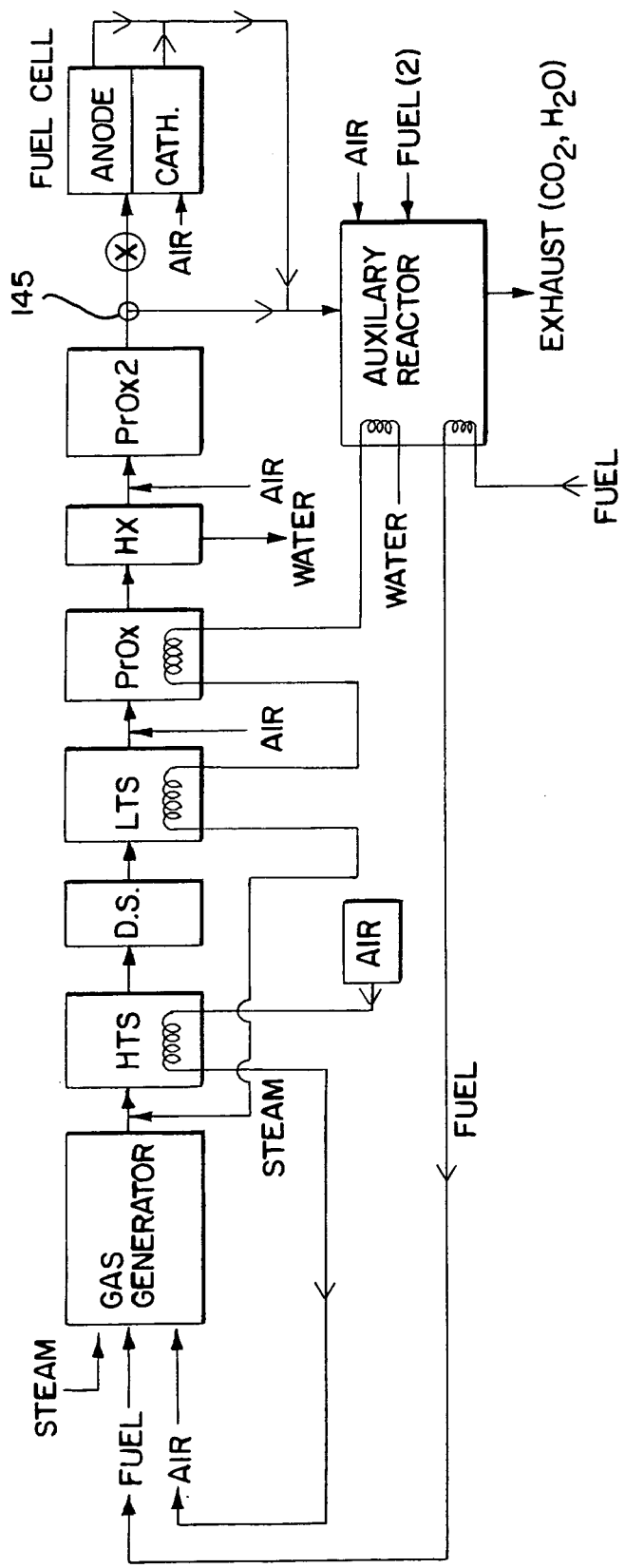
FIG. 26 is a diagrammatic illustration of a sample start-up procedure for the reformer, PrOx and auxiliary reactors of the system of FIG. 2.
Figure 27:
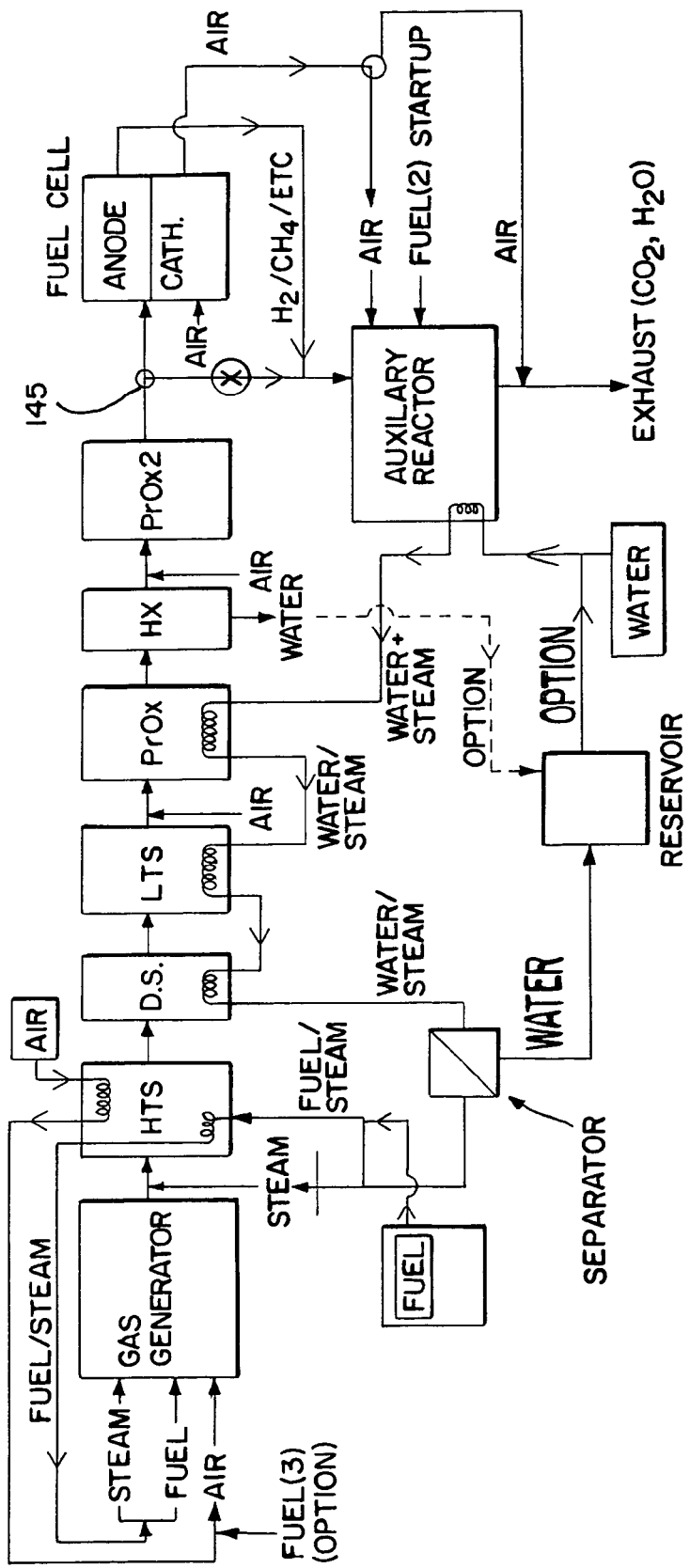
FIG. 27 is a diagrammatic illustration of a sample steady-state operation for the fuel cell system of the present invention.

Referring to FIG. 26, at start-up, or under conditions similar to start-up conditions, all components of the present system 10 are generally "cold," including the water and fuel sources. The term "cold" is intended not to refer to a specific temperature or range of temperatures at which the components may operate, but rather to indicate a threshold temperature at which the components operate at an acceptable level with respect to efficiency. Naturally, the temperature for each component will vary widely, and the temperature for any one component may vary widely from application to application.

With respect to liquid fuels it is necessary to vaporize the fuel so that it will burn in the POx chamber 34. This task is preferably performed by the auxiliary reactor 14, or a separate heat source, if available. Additionally, because sulfur can be a poison to reforming systems, certain fuels require desulfurization before entering the POx chamber 34, as well. The auxiliary reactor can be provided with a desulfurizing bed (as described above) to perform this function. To the extent these functions can be accomplished by other integrated system components after start-up (i.e., when they have achieved a sufficient temperature), the auxiliary reactor 14 may be discontinue operation in this manner at that time.

D. Reformer

As illustrated by FIG. 26 and detailed in FIG. 6, preheated fuel (or a fuel/steam mixture) enters the reformer reactor 12 at start-up via secondary fuel inlet 77 connected directly to the mixing chamber 76 of the mixing manifold 71. Within the mixing chamber 76 the heated fuel is mixed with a supply of oxygen delivered to the mixing chamber 76 via the helical oxygen/air tube 40. The homogeneous mixture is directed tangentially, via the inlet tube 70 and the bore 69 of the inlet section 56, into the POx chamber 34. The tangential delivery directs the hydrocarbon fuel flow immediately along the inside of the cylindrical wall 54 to effect a rising helical flow within the POx chamber 34.

At start-up a conventional ignition device 135, such as a spark plug, located within the hollow of base section 55, is provided to ignite the fuel/steam/oxygen mixture within the POx chamber 34. The POx chamber 34 may or may not contain a reforming catalyst. If used, the POx catalyst for the present invention may be any known catalyst used by those skilled in the art, but is preferably either a zirconium oxide (ZrO$_2$) catalyst (See co-pending U.S. patent application Ser. No. 09/562,789, filed May 2, 2000, now U.S. Pat. No. 6,524,550, and hereby incorporated by reference) supported on a noble metal (e.g., platinum (Pt), palladium (Pd), nickel (Ni)) in monolith form. The hydrocarbon fuel is ignited, and in the case of methane, hydrogen is liberated in the POx chamber 34 according to the following overall reactions:

$$CH_4 + \tfrac{1}{2}O_2 \rightarrow CO + 2H_2 \quad (2)$$

and

$$CO + H_2O \leftrightharpoons CO_2 + H_2 \quad (4)$$

The exothermic reaction (2) is self-sustaining and maintains an operating temperature range of from about 700° to about 1200° C. for one specific embodiment of a catalyzed POx chamber, or from about 1200° to about 1700° C. for one specific embodiment of a non-catalyzed POx. The generated heat preferably radiates by design outward to the steam reforming zone 35.

The reforming stream optimally travels in a helical path through the POx chamber 34 toward the ventilated end 59 of the cylindrical wall 54. At the plurality of apertures 60 the partially reformed fuel/oxygen/steam mixture travels outward into the steam reforming zone 35. The steam reforming zone 35 is preferably packed with a nickel catalyst which is supported at the discharge end of the zone by a metal screen 62. Within the steam reforming catalyst the remaining fuel undergoes the following steam reforming reactions to liberate hydrogen:

$$CH_4 + H_2O \rightarrow CO + 3H_2 \quad (1)$$

and

$$CO + H_2O \leftrightharpoons CO_2 + H_2 \quad (4)$$

The steam reforming reaction (1) is endothermic, requiring a great deal of heat energy to form hydrogen. The reaction draws heat through the cylindrical wall 59 of the POx chamber 34 to maintain an operation temperature of about 700° to about 1000° C. The reformate stream passes through the support screen 62 into the transition compartment 61.

Within the transition compartment 61 the reformate travels optimally radially outward and is provided a supply of steam from steam ring 63. The steam supply here serves two purposes. First, it helps to cool the reformate for the water-gas shift reaction. Higher temperatures favor the production of water and carbon monoxide (the "reverse shift reaction"). Second, the water is a necessary component to react with the carbon monoxide to produce hydrogen and carbon dioxide. Too little water added will result in poor performance of the HTS and LTS shift beds.

The reformate/steam mixture moves axially from the transition compartment 61 into the first bed of the shift reaction zone 72, the HTS bed 37. The purpose of the HTS bed 37 is to reduce the concentration of carbon monoxide in the reformate stream. The temperature of the HTS bed 37 increases as the carbon monoxide concentration is reduced. The activity of the catalyst increases with the temperature. However, the rising temperature is, of course, detrimental to the purpose because, as stated previously, the higher temperature favors the reverse shift reaction—i.e., production of water and carbon monoxide. To cool the stream, some of the heat produced in the HTS bed 37 is transferred to the fuel and oxygen/air supply through the helical tubes 38 and 40, respectively. Still, the operating temperature range of the HTS bed 37 is from about 550° C. at the inlet end to about 350° C. at the discharge end. The concentration of carbon monoxide within the reformate stream is reduced in the HTS bed 37 to about 2.0%.

Optionally, a desulfurizing bed (not shown) may be disposed adjacent the HTS bed 37. The desulfurizing bed would be comprised of a suitable catalyst such as zinc oxide (ZnO$_2$) in granule or bead form. As the reformate passes through and contacts the zinc catalyst poisoning sulfur and sulfur compounds would be removed from the stream.

A second shift bed is also provided in the present invention. The LTS bed 36, similar to the HTS bed 37, provides further reduction of the carbon monoxide concentration in the reformate stream. However, the LTS bed 36 is continuously cooled to provide an isothermal bed. In the present embodiment, the LTS bed 36 includes four rows of helical windings (E, F, G, and H) of the water tube 39 in a heat exchange relationship with the bed catalyst. The windings may be reversed if desired—i.e., the water inlet feeding winding (H) and finally ending with the discharge of steam at the outlet of winding (E). The discharged steam is preferably directed to a steam separator as discussed previously. The cooled shift bed permits greater reduction of the carbon monoxide concentration in the reformate stream.

The reformate exits the LTS bed 36 through a screen 80 before entering into the open discharging chamber 81 of the reformer reactor 12. The reformate collecting in the discharging chamber 81 is eventually directed to an outlet 82 positioned at the approximate center of the reactor top surface 22. From the outlet a transfer conduit 20 directs the reformate flow into the PrOx reactor 13.

Figure 28:
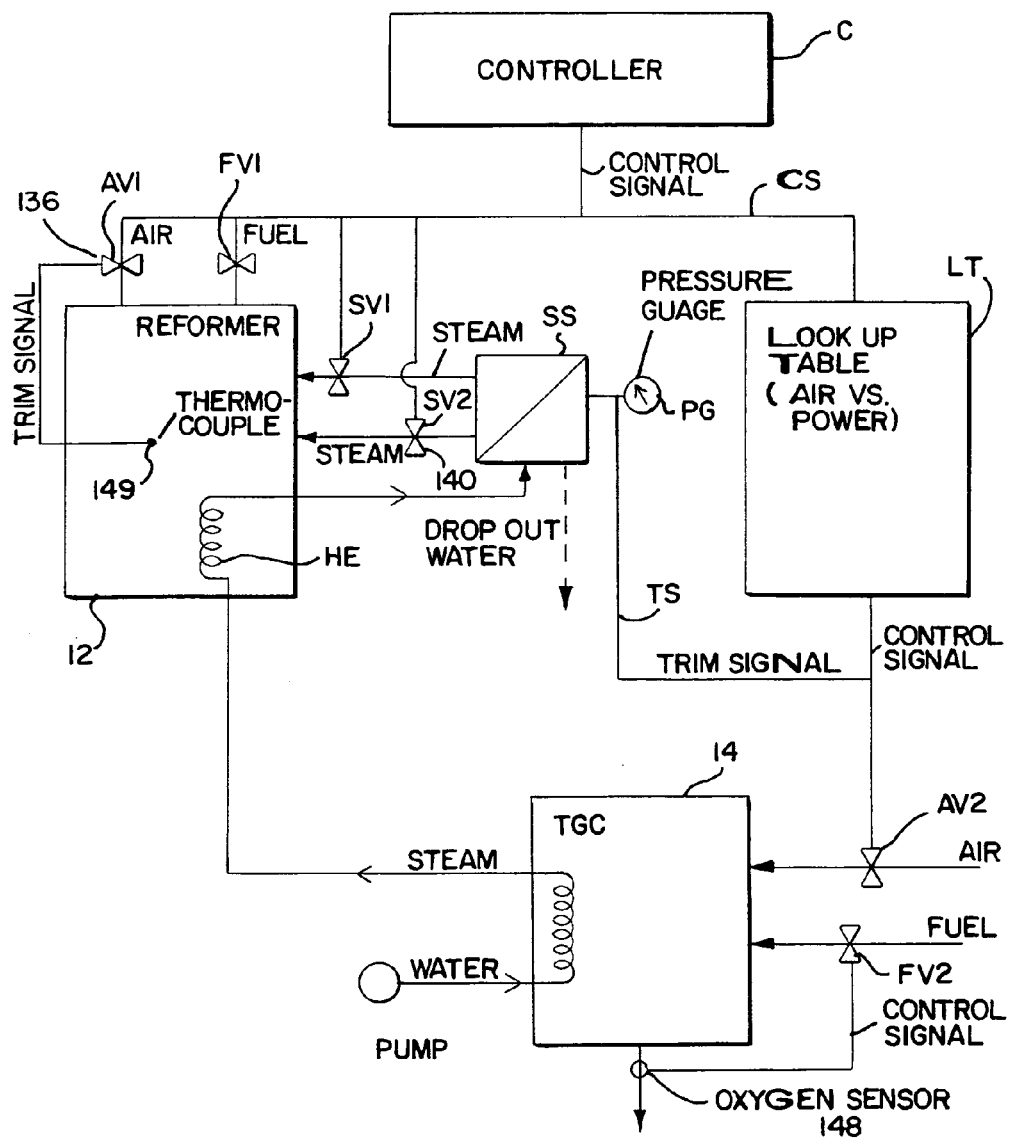
FIG. 28 is a diagrammatic illustration of control points for a reformer, an auxiliary reactor, and a steam separator in one embodiment of the present invention.

With respect to process controls, four major flows into the reformer 12 need to be properly controlled: air, fuel, POx steam and the HTS bed steam through steam ring 63. The air flow may be controlled using an air flow sensor that feeds back to a valve 136, as illustrated in FIG. 25. Fuel may be controlled using a fuel injector with or without a conventional fuel sensor (not shown). If the fuel flow is choked across the injector and the supply pressure is constant, the flow should be constant for a given duty cycle, regardless of variations in downstream pressure. Alternatively, differential pressure across the injector may be controlled to maintain a constant flow for a given duty cycle. Periodic calibration may be necessary to eliminate the need for a fuel sensor. The POx steam flow may be controlled using a motor actuated or solenoid valve 140, as illustrated in FIG. 28, and an orifice plate 139 can be used to measure the steam flow. Control of the HTS bed steam may also be accomplished with a pressure actuated or control valve 155 to control the flow rate and the pressure in the system. The pressure setpoint on the regulator 155 is typically changed manually, or may be controlled remotely. For transient steam control (see System and Sub-System Control and Operation below) to the HTS bed 37 it may be desirable to vary the pressure setpoint to protect the overall steam-to-carbon ratio from a drastic drop. Creating such a variable pressure setpoint using a control valve that has feedback from a pressure transducer is one alternative.

In addition to the flow controls discussed, several pressure transducers and numerous thermocouples may be necessary to monitor and control the pressure and temperature of the reformer 12.

E. PrOx Reactor

Beginning with the PrOx inlet 13, it is typically connected downstream of the reformer reactor 12 (as shown in FIG. 1) where a hydrocarbon material is reformed with steam to produce a hydrogen-rich reformate having a small, but undesirable, concentration of carbon monoxide (typically <1%). In addition to hydrogen and carbon monoxide, the reformate includes carbon dioxide, water, and other carbon containing compounds (typically only a few percent or less).

As the reformate enters the reactor 13 at the inlet 84, referring to FIG. 13, it is directed into the central manifold first zone 91 through a diffuser 88. Optionally, the diffuser 88 may be eliminated from the reactor.

In operation, the reformate stream is initially delivered to the inlet at a first pressure ($P_1$) and temperature ($T_1$), but immediately experiences a pressure drop ($\Delta P$) to a second pressure ($P_2$) upon entering the first zone 91 through the diffuser 88. The temperature of the reformate at this point is initially unaffected. However, the pressure is sufficient to force the reformate stream through the first wall 92 of the first zone 91, which has a temperature typically within the range of from about 200° F. to about 500° F. As the reformate travels radially from the first zone 91 in a plurality of flow paths it enters the catalyst bed 95 of the second zone 94 within the reactor 13 adjacent the first zone 91.

As the reformate stream encounters the catalyst bed 95, continuing in the same general diverging directions through the second zone 94, the carbon monoxide of the stream is oxidized to carbon dioxide by the following reaction:

$$CO + \tfrac{1}{2}O_2 \rightarrow CO_2 \tag{5}$$

The oxygen necessary for sufficient oxidation to occur may be provided as a mixture with the incoming reformate or introduced to the reactor 13 via an incoming air line 141, as shown in FIG. 15. Additionally, as it becomes necessary to replenish the oxygen for reaction with the carbon monoxide, secondary air inlets may be provided to direct the desired quantity of air into the reactor 13. These inlets would help to ensure that the reformate throughout the catalyst bed 95 has a sufficient supply of oxygen.

As the secondary air enters the second zone 94, it naturally diffuses throughout the catalyst bed 95 where it reacts with carbon monoxide adsorbed by the selective catalyst according to the reaction above.

The oxidation of carbon monoxide is further promoted by maintaining the temperature of the catalyst bed within a desired range, preferably about 20° C. to about 170° C. Higher temperatures result in faster reaction rates, permitting the use of a smaller volume reactor, but also promoting the undesired side reactions (2) and (3) above. The present reactor 13 is preferably isothermal.

The PrOx reactor 13 of the preferred system comprises a means for actively cooling the catalyst within the second zone 94. A preferred means is shown in FIG. 13. Water/steam tube 97, double-helically configured throughout the catalyst bed 95, provides a continuous heat exchange with the catalyst bed 95. That is, a flow of water from a convenient source is pumped continuously into the tube 97 through the water inlet 86 of the PrOx reactor 13. The cooling fluid flows through the water/steam tube 97 drawing heat from the catalyst bed 95, which is in contact with the water/steam tube 97, and discharging from the reactor 13 at the water outlet 87. The water/steam tube 97 is preferably made from a very good conductive, but non-reactive metal, such as 304 SS, to further assist in the heat exchange. It should be understood that several other boiler tube arrangements would be suitable for actively cooling the catalyst bed including, but not limited to, single-helical, longitudinal, and any other configuration which results in the boiler tubes being interspersed throughout the second zone 94 or catalyst bed 95. It should also be understood that the water/steam tube 97 may be extended into the first zone 91 to actively cool the reformate before it enters the second zone 94.

The discharging heated water/steam from the water outlet 87 of the active cooling means may be used elsewhere in the system 10. For instance, additional tubing may connect the water outlet 87 to a heat exchanger used in a shift reaction zone 72 (see FIG. 6). In such a use, the heat from the heated water/steam may be dissipated within the shift reaction zone 72 to help raise and maintain the temperature of the reactor 12 to within a desired high temperature range.

In any event, after the reformate stream has passed through the second zone 94 it enters a discharge flow passing through a second metal (stainless steel) screen wall 96 which defines the outer extent of the second zone 94. Referring again to FIG. 13, the reformate then enters an annular discharge channel 99 where it is directed toward the reformate outlet 85. The concentration of carbon monoxide in the reformate stream at this time should be no more than about 500 ppm. Preferably it is lower, for the composition of the reformate, however, also includes hydrogen, carbon dioxide, water, and nitrogen.

The system configuration, in order to deal with flow variations of the reformate made in response to changing power requirements, may include a PrOx reactor 13 (including a second PrOx reactor 13', as shown in FIG. 2) having dynamic control of the oxygen used to oxidize the carbon monoxide concentration. As discussed previously, the oxygen to carbon monoxide ratio must be maintained within a stochiometrically balanced range based on reaction (1) above. Preferably between about 1:4 to about 1:1, but most preferably about 1:2, oxygen to carbon monoxide.

To maintain the proper mix ratio, the reactors may include means for determining the relative amount of carbon monoxide in the stream. The means can be provided by an infrared carbon monoxide sensor 142. The carbon monoxide sensor 142, as shown in FIG. 19, may be placed in-line after a chiller condenser 105. This position is preferable because: (1) water in the reformate stream may interfere with the infrared sensor; (2) the temperature of the stream has been cooled at this point by the chiller condenser and is, therefore, more suitable for the placement of the sensor; and (3) the carbon monoxide concentration is not too low, which makes a good quality signal to noise ratio a better possibility.

The sensor 142, if used, could be read periodically to determine the carbon monoxide concentration exiting the PrOx reactor 13. A control scheme can be utilized to control a means for adding an amount of oxygen to the reformate stream to produce the desired ratio of oxygen to carbon monoxide as it enters the PrOx reactor 13, or alternatively, as it enters the second PrOx reactor 13'.

Additionally, the sensor 142 allows for the utilization of means for automatically adjusting the amount of oxygen containing gas being added to the stream based upon carbon monoxide concentration fluctuations.

Alternatively, instead of (or in addition to) monitoring the concentration of carbon monoxide directly, means for determining the concentration may be indirect. For instance, means may be provided for monitoring at least a first parameter which may give an indication of the relative concentration of carbon monoxide. This includes calculating the desired amount of oxygen based upon normally expected amounts of carbon monoxide to be produced by the source and adjusting oxygen flow based on these calculated expectations. Possible methods for determining carbon monoxide concentrations include determining a change in pressure within the preferentially oxidizing reactor or reformer reactor, determining a change in temperature within the preferentially oxidizing reactor or reformer reactor, and measuring time from an event known to cause carbon monoxide fluctuation.

Figure 18:
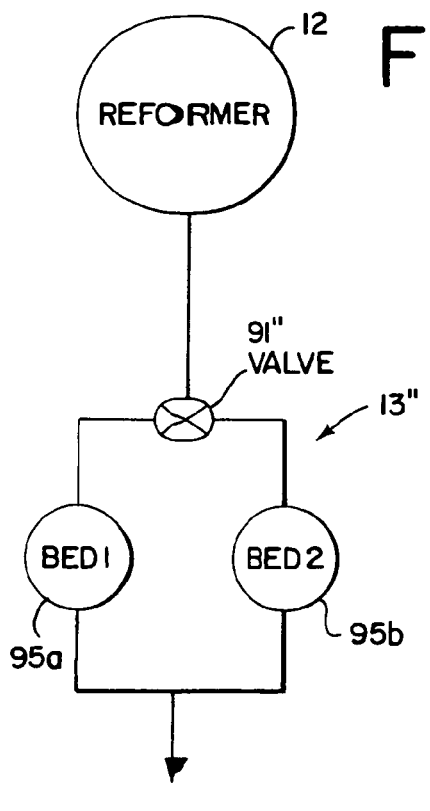
FIG. 18 is a diagrammatic illustration of an alternative PrOx reactor system design having a two catalyst beds configured in parallel.

Another alternative embodiment of the present system handles the fluctuating demand in different manner. Such an embodiment, as shown in FIG. 18, includes a PrOx reactor 13" having a first catalyst bed 95a having a catalyst for oxidation of carbon monoxide in preference to diatomic hydrogen, and a second catalyst bed 95b having a catalyst for oxidation of carbon monoxide in preference to diatomic hydrogen. During operation, a first manifold 91" within the reformate conduit 20" connects both the first and second catalyst beds, 95a and 95b, in parallel to the reformate source (i.e., the reactor 12) for optionally directing the flow through one or the other of the first or second beds, 95a or 95b, or both in the case of an increase in the reformate source flow so as to accommodate the added flow.

Preferably, the dynamic reformate flow is detected by means for monitoring flow of the reformate from the source, such as a suitably positioned flow meter. The manifold is then designed to be responsive to the means for monitoring so as to direct the flow of reformate through either one or both of the catalyst beds in response to a fluctuation of reformate flow.

A signal is emanated from the flow meter in connection with the source and indicating a change in operational parameters of the source which will cause a corresponding change in flow of the reformate from the source. The operational parameters of interest may include increased demand, decreased demand, acceleration, deceleration, start-up, shut down, change of fuels, thermal fluctuations of the source, fuel input, steam input, and the like.

With respect to either a single or double-stage PrOx, the reformate as it exits either PrOx reactor stage of the system, if suitable, may be directed to the PEM-fuel cell 15, as illustrated in FIG. 2, for use in the generation of electricity, as is known in the art. Alternatively, where the reformate is not yet suitable for use in a fuel cell, the stream may be either further "cleaned" of compounds which may affect the operation of the fuel cell or, in the case of reformate formed at start up, it may be combusted in an auxiliary reactor until the quality of the product stream reaches acceptable levels.

Combustion is permitted, referring again to FIG. 2, by a discharge line 143 connecting the PrOx reactor 13' (or 13, in the case of a single PrOx reactor) to the PEM-fuel cell 15, but also having a branched conduit 144 controlled by a valve 145 and connected to the auxiliary reactor 14. At start up, the valve 145 directs the product stream from the PrOx reactor 13 into the conduit 144 for eventual discharge into the auxiliary reactor 14 where it can be completely burned off. Burning off oxidized reformate immediately after start up minimizes poisoning of the PEM-fuel cell 15. This process is used because at start up the steam reforming chamber 35 and the shift beds, 36 and 37, of the reformer 12 and the catalyst bed 95 of the PrOx reactor 13 have not achieved the necessary temperatures to reform, shift, or oxidize the hydrocarbon/reformate stream completely. The result is a reformate having a high concentration of carbon monoxide or other fuel cell poisons.

The preferred PrOx has two air flows, a water flow, and a fan that must be controlled for proper operation. The air flow control is preferably a closed-loop system which measures the air flow rate using a mass air flow sensor and controls the flow using a proportional solenoid valve (FIG. 24).

The temperature of the PrOx reactor catalyst bed 95 may be controlled by a conventional pool boiler design, known by those skilled in the art. The water level in the pool boiler can be maintained by measuring the water column height with a differential pressure transducer and controlling water flow with a solenoid valve. The steam produced in the PrOx should preferably go to the HTS bed 37, if possible.

The inlet temperature of a second PrOx reactor 101 (see FIG. 15) can be controlled by varying the air flow over a cross flow heat exchanger 147 (FIG. 19). The temperature can be measured with a thermocouple located in the reformate line just before the second PrOx reactor 101, as discussed above. The air flow can be provided by at least one fan, and preferably two fans, with a conventional speed control PWM drive (not shown).

F. Auxiliary Reactor

In operation of the first preferred embodiment of FIG. 20, exhaust anode gases from the fuel cell 15 are directed into the inlet tube 130, preheated within the burner chamber 122 of the burner assembly 121 and directed into the first chamber 107 upstream of the catalyst 110 where the gases mix with air.

As the fuel cell exhaust gases pass through the first chamber, the combination of the heated fuel stream and the platinum (Pt) catalyst 110 causes catalytic oxidation of the exhaust gases. The remaining exhaust gases are then directed through the outlet end 109 of the first chamber 107 and into the second annular chamber 112, referring to FIG. 20. The design of second annular chamber 112 directs the stream of burned exhaust gases downwardly through the first annular sub-chamber 114, in counter-flow fashion to the direction of the flow of the exhaust gases in the first chamber 107. At the end of the first annular sub-chamber 114, the stream is redirected upwardly through the second annular sub-chamber 115 in counter-flow fashion with the direction of the flow of gases within the first annular sub-chamber 114. Located at the opposed end of the second annular sub-chamber 115 is an exhaust outlet 152, which allows the remaining exhaust gases to be released into the atmosphere.

Included within the second annular sub-chamber 115 is a helical tube 131 that extends the length of the second annular sub-chamber 115. The helical tube 131 is configured to allow for the flow of water. The fuel cell exhaust stream flowing upwardly through the second annular sub-chamber 115 exchanges heat with the water found within the helical tube to assist in the formation of a two-phase water/steam mixture. The helical tube 131 is connected to the water/steam line 39 (FIG. 2) of the reformer 12 via the conduit 132 to provide the water/steam needed for the LTS bed 36 of the reformer 12 (FIG. 6). Where a more compact reactor design is required, a plurality of fins 133, preferably comprised of copper, are spaced in predefined intervals throughout the length of the helical coil 131. The fins 133 radially extend from the circumference of the helical coil to enhance the exchange of heat between the heated exhaust gas stream and the water within the helical coil 131.

Located at the end of the reactor 14 opposite the burner assembly 121 is unreformed fuel inlet 150, which allows for the introduction of unreformed fuel into the reactor 14. The unreformed fuel is directed through U-shaped conduit 120, defined within the third annular wall 113, in constant heat exchange relationship with the stream of fuel cell exhaust gases though the first and second annular sub-chambers, 114 and 115, respectively. The flow of the unreformed fuel through the first half of the U-shaped conduit 120, i.e., the third annular sub-chamber 118, parallels the flow of the fuel cell exhaust gas through the first annular sub-chamber 114, and the flow of the unreformed fuel through the second half of the U-shaped conduit 120, i.e, the fourth annular sub-chamber 119, parallels the flow of the fuel cell exhaust gases through the second annular sub-chamber 115. The resultant exchange of heat from the exhaust gases to the unreformed fuel preheats the unreformed fuel for introduction into the reformer 12 via fuel line 17. Preferably, a zinc-containing catalyst is placed within either of both halves of the U-shaped conduit 120, i.e., the third annular sub-chamber 118 or the fourth annular sub-chamber 119, for desulfurizing the unreformed hydrocarbon fuel flowing therethrough.

The auxiliary reactor 14 is used to combust exhaust from the PrOx not consumed in the fuel cell 15. This allows the emissions to be maintained at near zero. The excess heat is used to generate steam. The overall goal of the control strategy, therefore, is to keep the catalyst 110 at a temperature high enough to burn the combustibles in the anode exhaust, maximize steam production, and keep emissions low. To accomplish this it is necessary to ensure that the auxiliary reactor 14 is operating lean and at a temperature range of about 1000° F. (approx. 550° C.) to about 1470° F. (approx. 800° C.). One method of doing this is to set a desired temperature and excess oxygen level for the auxiliary reactor 14. The oxidant flow rate can be adjusted based on the temperature in the catalyst 110 to maintain the desired temperature. As changes are made in the system operation, an oxygen sensor will detect these changes and also adjust the oxidant flow rate to ensure lean operation.

In operation of the second preferred embodiment, as seen in FIG. 21, exhaust anode gases from the fuel cell 15 are directed into the inlet tube 230, preheated within the burner chamber 222 and directed into the first chamber 207 upstream of the platinum (Pt) catalyst 210. As the fuel cell exhaust gases pass through the first chamber 207, the combination of the heated fuel stream and the platinum (Pt) catalyst 210 causes catalytic oxidation of the exhaust gases. The remaining exhaust gases are then directed through the outlet end 209 of the first chamber 207 and into the second annular chamber 212, as shown in FIG. 21. The design of second annular chamber 212 redirects the stream of burned exhaust gases upwardly in counterflow fashion to the direction of the stream within the first chamber 207. Located at the opposed end of the second annular chamber 212 is an exhaust outlet 252, which allows the remaining exhaust gases to be released into the atmosphere.

The fuel cell exhaust stream flowing upwardly through the second annular chamber 212 exchanges heat with the water/steam found within the first helical tube 231 to assist in the formation of a two-phase water/steam mixture. The two-phase water/steam mixture in the first helical tube 231 is then directed to the second helical coil 232 via conduit 233, external to the reactor 14. The additional heat within the first chamber 207 is furthered transferred to the two-phase water/steam mixture within the second helical coil 232 to further promote the formation of steam. The second helical tube 232 is connected to the water/steam line 39 (FIG. 2) of the reformer 12 to provide the steam needed for the LTS bed 36 (FIG. 6).

The third preferred embodiment, as seen in FIG. 22, directs exhaust anode gases from the fuel cell 15 into the inlet tube 327, preheats the anode exhaust gases within the burner chamber 322 and directs the exhaust gases into the first chamber 307 upstream of the platinum (Pt) catalyst 310. As the fuel cell exhaust gases pass through the first chamber, the combination of the heated fuel stream and the platinum (Pt) catalyst 310 causes catalytic oxidation of the exhaust gases. The remaining exhaust gases are then directed through the outlet end 309 of the first chamber 307 and into the second annular chamber 312, as shown in FIG. 22. The design of second annular chamber 312 redirects the stream of burned exhaust gases upwardly in counterflow fashion to the direction of the stream within the first chamber 307. Located at the opposite end of the second annular chamber is an exhaust outlet 330, which allows the remaining exhaust gases to be released into the atmosphere.

The fuel cell exhaust stream flowing upwardly through the second annular chamber 312 exchanges heat with the water/steam found within helical tube 331 to assist in the formation of a two-phase water/steam mixture. Helical tube 331 is connected to the water/steam line 39 (FIG. 2) of the reformer 12 to provide the steam needed for the LTS bed 36 (FIG. 6).

G. Steady-State Control

Control of the system 10 becomes easier once start-up is complete and the fuel cell 15 is brought on-line. A description of the control for each subsystem during steady-state operation is given below with particular reference to FIG. 27. At all times during operation, the values of critical process variables should be checked against upper and lower limits. If any value is out of these limits, an alarm can be triggered to notify the operator.

1. Reformer (FIGS. 1–11)

Once the reformer 12 has been brought up to the preferred operation temperature, it is controlled by maintaining the desired power, equivalence ratio, and steam to carbon ratio in both the POx chamber 34 and the HTS bed 37. The temperature should be held at the desired setpoint by slightly adjusting the air flow and thus the equivalence ratio. To adjust the steam reformer exit temperature, the POx chamber temperature setpoint can be adjusted. The POx steam to carbon is maintained using a control valve 156 to control steam flow. The system is designed to produce the remaining steam needed internally and this excess is fed to the HTS bed 37 through a back-pressure regulator.

2. PrOx Reactor (FIGS. 12–19)

The oxygen to carbon monoxide ratio in the first PrOx reactor 13 should be a fixed number determined empirically from initial testing done conventionally to characterize the system 10. Provided there is sufficient air, the design of the first PrOx reactor 13 should be such that the carbon monoxide output will be relatively constant with varying carbon monoxide at the reformate inlet 84. In the event that there are no online analyzers for the system 10, the oxygen to carbon monoxide ratio can be set to account for an upper limit of steady state inlet carbon monoxide. The oxygen to carbon monoxide ratio for the second PrOx reactor 101' should be adjusted to maintain a fixed temperature rise through the catalyst bed 95 and outlet carbon monoxide concentrations less than 10 ppm.

3. Auxiliary Reactor (FIGS. 20–22)

The auxiliary reactor 14 is used to burn off anything not consumed in the fuel cell 15 during steady-state operation. This allows the emissions to be maintained at near zero. The excess heat is used to generate steam. The overall goal of the control strategy, therefore, is to keep the catalyst at a temperature high enough to burn the combustibles in the anode exhaust, maximize steam production, and keep emissions low. At the same time, the upper temperature limit on the catalyst must be avoided. To accomplish this it is necessary to ensure that the Auxiliary reactor 14 is operating lean and within a temperature range of about 1000° to about 1470° F. One method of doing this is to set a desired temperature and equivalence ratio for the Auxiliary reactor 14. The oxidant flow rate can be adjusted based on the temperature in the catalyst to maintain the desired temperature. As changes are made in the system operation, the oxygen sensor 148 should detect these changes and the air flow rate will then be adjusted to ensure lean operation. It may be necessary to vary the equivalence ratio setpoint if the concentration of hydrogen in the anode exhaust varies significantly.

4. Water/Steam

At steady state, the pump speed and thus water flow rate are controlled based on the total steam being generated. In the present embodiment, the steam added to the POx chamber 34 and the HTS bed 37 are added together and multiplied by a factor of safety. This becomes the setpoint for the water flow rate, and thereby ensures that superheated conditions are avoided. If a superheated condition occurs, the factor of safety is automatically modified to add additional water until the steam temperature returns to the saturated temperature. An alternative approach determines the necessary water flow according to an operating map based on fuel input.

H. Transient Control

During transient conditions, the control of the reforming system 10 must be modified slightly to prevent excessive temperatures, high carbon monoxide concentration, and other emissions. The following disclosure contains a general description of control goals of each subsystem during transient conditions.

1. Steam Generation—Generally

In overview, according to the invention, the system 10 integrates elements of thermal control with elements of necessary steam generation. For example, temperature of shift beds are impacted by heat exchange with a steam generating system (or steam loop). Also, reformate temperature is impacted by addition of steam in connection with a high temperature shift reaction. Steam condensation and water separation from the reformate is integrated as cooling of reformate to the benefit of preferential oxidation.

Also, according to the invention, steam generation is integrated in a unique way in the system 10, with processes and apparatus responsible for dynamic (e.g. transient) operation, such as following load demands, and rapid start-ups. Other advantages and aspects will be disclosed herein with respect to the system's overall thermal balance and dynamic response control.

FIG. 28 discloses the system 10 control scheme for dynamic control. This control design and process is applicable for the many uses where a load on the system is dynamic, that is, the demand for hydrogen-rich gas varies. For example, transportation fuel cell applications will require acceleration and deceleration of the vehicle, which will cause a dynamic response from the system if integrated into such a system. More importantly, the need for a quick response will be required, and according to the invention, the disclosed system can meet that need.

Generally, the process includes supplying a hydrocarbon fuel and oxygen at a first rate to reformer reactor 12 for steady state operation. Steam generated by the auxiliary reactor 14 and the heat exchange in the low temperature shift zone 36 is also supplied to the reactor 12 at a first rate for steady state performance. At steady state pressure on the steam loop 16 including auxiliary reactor 14, the heat exchange tubes 39 in the low temperature shift bed 36 and the steam separator 105 is kept at a pressure of about 130 psi. Upon a change in demand, either for more or for less hydrogen, the system changes the rate of supply of each of the hydrocarbon fuel and the steam to a second supply rate. The change in steam demand causes an immediate change in loop steam pressure. According to the invention, the steam pressure is permitted to change within an acceptable range.

Various aspects of the system design permits this as well as a rather rapid recovery of the loop 16 steam pressure.

Preferably the acceptable range within which the steam pressure is permitted to change is about 200 psi, but more preferably about 150 psi. In other words, the steam pressure for system 10 is permitted to vary between about 50 psi to about 200 psi during a transient operation.

For example, if the demand on system 10 increased, a control signal would be sent from the device, such as a fuel cell, depicted generically as a controller (C) in FIG. 28. Based upon that signal, a direct and proportional signal would be sent to air supply valve (AV1) hydrocarbon fuel supply control valve (FV1) to increase the rate of each.

Also in response to the control signal both steam valves (SV1) and (SV2) are respectively adjusted to increase supply of steam to the fuel steam mixture and to increase the supply of steam to the reformate before it enters the high temperature shift reaction. According to one aspect of the invention, the supply of both of these constituents can be, and preferably is kept at the steady state steam to carbon ratio of about 3 during the transient response.

Due to the fact that the system 10 employs two-phase pressurized steam, the delivery of extra steam from the steam separator 151 occurs within fractions of a second and can be delivered in a matter of one or more milliseconds. That is, upon a drop in pressure when valves (AV1) and (FV1) are adjusted to increase supply, the pressure drop causes the immediate production of steam from latent heat in the water of the two-phase mixture. The system response is also significantly aided, according to the invention, by the almost immediate (millisecond) creation of steam from the heat exchangers in the low temperature shift and PrOx catalyst beds. Not only is there latent heat in the water in those heat exchangers, there is a relatively large heat buffer provided by the catalysts and reactor masses. It is believed that steam from these heat exchangers is readied for supply within one or more milliseconds as well.

In response to the control signal, the valve (AV2) is adjusted to increase air flow to the auxiliary reactor 14. An oxygen sensor 148 senses the that the oxygen concentration is over a set point and triggers a control response of valve (FV2) to increase the fuel to the auxiliary reactor 14. The result is added steam generation. The oxygen sensor 148 will continue to attempt to keep the fuel supply to the auxiliary reactor 14 in limit. In the meantime, as the auxiliary reactor 14 and the heat exchangers in the reformer 12 and the PrOx 13 continue to generate steam, the pressure begins to return to the desired 130 psi. According to one aspect of the invention, synergistically, the higher output by the reformer and PrOx increases their contribution to the generation of steam. Once at the new power or burn rate, the system 10 temperatures also tend to better equilibrate due to the advanced amount of steam supply due to the added heat exchange presented by the design.

As disclosed in FIG. 28, the response of the air valve (AV2) to the control signal (CS) is indirect. The control signal (CS) is first assessed and pursuant to predetermined values in a computer memory lookup table (LT), the appropriate auxiliary reactor burn rate is determined and a secondary control signal is sent to valve (AV2). However, while the pressure is returning to the desired 130 psi, supplementary trim control signals (TS) are sent to air valve (AV2) according to pressure values sensed by pressure gauge (PG) to adjust the air supply downward. Again, the oxygen sensor 148 will reduce the fuel according to the sensed reduction of air.

According to another aspect of the invention, this trimming process occurs independently of whether or not a control signal is sent from the controller (C). This trimming process helps maintain the system thermal equilibrium caused by other factors, such as changes in system efficiencies, and ambient temperature changes.

It should be noted, that thermal stability of the partial oxidation reaction is controlled by a POX trim signal (TS) generated in response to sensor (thermocouple) 149. This trim signal causes the air flow to the POx to be adjusted based upon temperature of reactants in the partial oxidation reaction. Preferably this trim signal can be generated independently of a control signal from controller (C).

Also, according to another aspect of the invention, the sizing of the partial oxidation zone and downstream steam reforming zone can be such that high volumetric flow rates caused by either a very large increase in hydrogen demand or a high steady state demand, will cause a much higher mixing velocity and swirling of the gases to extend vigorously upward in the POx chamber which raises its efficiency and thermal output. At some higher flow levels, partial oxidation at significant levels will begin to be promoted by the steam reforming catalyst.

It is also useful to consider a decrease in demand to illustrate other aspects of the invention. Upon a downturn in hydrogen demand, a control signal is generated and sent as in the discussion above. All of the valves and controls respond exactly as above but to decrease air, fuel and steam supplied to the various components. The pressure is again permitted to rise, but preferably not to more than 200 psi in this embodiment. The system again comes back to equilibrium. However, the challenge faced with a decrease is what to do with the excess steam, and or thermal energy. The system 10 is designed and sized such that only a portion of the steam is generated by the reformer 12 and PrOx reactor 13 which may have significantly higher thermal mass than the auxiliary reactor and steam loop. In the preferred embodiment of system 10, only about half of the thermal energy needed for steam generation is supplied by the auxiliary reactor 14. In other embodiments, a different balance of thermal energy may be desired. Also, the fact that heat exchange is done with tube boilers coupled with an auxiliary steam generator, both permit the total water and steam mass to be smaller, versus for example a pool boiler. This permits reduction in the amount of excess steam generated after turn down. It is also this relatively low ratio of catalyst mass to the mass of water in each of: (1) the tube heat exchangers; and, (2) the system as a whole, that permits such a rapid response in steam generation in a turn-up scenario.

Another significant transient is start-up. According to one aspect of the invention provides that upon start up, the auxiliary reactor 14 is started to generate steam. This steam is routed through the catalyst beds 36 and 37 as discussed herein. This advantageously permits these reactors to address carbon monoxide production earlier after start up than otherwise would be the case. This permits an earlier delivery of an acceptable hydrogen-rich stream to a load, such as a fuel cell 15.

2. Reformer

During transients, the goal for the reformer 12 is to change power as quickly as possible while maintaining the steam to fuel ratio in the POx chamber 34, as well as the overall steam to fuel ratio and the temperature in the POx chamber 34. This helps prevent any large spikes in the carbon monoxide concentration. One component of the control of the reformer 12 during transient conditions is for the flows of fuel, air, and steam to all follow each other. The time required for the air to reach a new steady-state point will directly affect the speed of the transients. When a request for a change in air is sent, the entire reformer 12 must wait for this change to occur. As the air flow is ramped up or down to the desired flow rate, the fuel flow rate must follow this change to maintain the set ratio (preferably, about 1.5 steam to carbon in the reformer 12 with another 1.5 added directly to the HTS bed 37). The steam flow rate to the POx follows the fuel flow rate to maintain the desired steam to carbon ratio. Once the transient condition is complete, the automatic control to maintain steam to carbon ratio in the POx chamber 34 can be resumed.

When increasing the power in the system 10, the steam to carbon ratio in the HTS bed 37 will most likely drop (since the system will not immediately increase steam production) unless an adjustment is made in the steam system. If the overall steam to carbon ratio drops, the carbon monoxide will increase at the exit of the reformer 12. To prevent this, it may be necessary to drop the pressure setpoint in the steam loop to allow extra steam into the HTS bed 37. This adjustment can help to minimize any spike in carbon monoxide concentration exiting the reformer 12 and the extra air required by the PrOx reactor 13 during transient conditions. The pressure should then be gradually increased back to the nominal value as steam production increased at the new power and the overall steam to carbon ratio begins to rise again. Clearly adjusting the pressure in the steam loop is not the best solution if the system is going through frequent transient conditions. Such potentially could result in a loss of steam pressure and a drop in the catalyst bed temperatures. In this case, it may be necessary to re-light the auxiliary reactor burner chamber 122 and generate additional steam to maintain the steam loop pressure.

3. PrOx Reactor

If steam control is maintained in the reformer, PrOx air flow during transients should adjust to maintain to set oxygen to carbon monoxide ratios the reformate flow change. Where a loss of steam flow rate occurs and elevated carbon monoxide levels occurs, the oxygen to carbon monoxide ratio in the first PrOx reactor 13 can be mapped against time to give an elevated amount of air until the LTS bed exit carbon monoxide concentration level returns to its steady state value. Such a map can be used to determine empirically where an online analyzer will be available. The oxygen to carbon monoxide ratio for the second PrOx reactor 13' need not be adjusted since the carbon monoxide outlet from the first PrOx 13 does not change during the transient.

4. Auxiliary Reactor

Control of the auxiliary reactor 14 during transient conditions is similar to control during steady state. As more or less anode exhaust reaches the auxiliary reactor 14, the oxygen sensor 148 picks up on this change and adjust the air flow rate into the system 10. If the concentration of hydrogen in the anode exhaust changes significantly, the equivalence ratio setpoint for the auxiliary reactor 14 will be adjusted accordingly to maintain the desired temperature.

5. Water/Steam

Since maintaining steam in the fuel processing system is so important to the performance of the system 10, appropriate adjustments of the water flow rate into the system 10 are also extremely important. An increase/decrease in power will result in more/less steam production and the water flow rate should be changed accordingly. The steam flow rate into the POx chamber 34 and HTS bed 37 will lag behind this change, however. Alternatively, it may be necessary to estimate what the water flow rate should be at different powers experimentally and use this information during transients instead of relying on the total flow rate of steam.

While specific embodiments have been illustrated and described, numerous modifications are possible without departing from the spirit of the invention, and the scope of protection is only limited by the scope of the accompanying claims.

We claim:

1. A shift reactor for subjecting carbon monoxide and water to a water-gas shift reaction to produce carbon dioxide and diatomic hydrogen comprising:
    a shift reactor vessel including a first shift reaction zone, the first shift reaction zone having a first shift catalyst bed, an input end for receiving reformate constituents including carbon monoxide and an outlet end for discharging shift-reacted constituents including carbon dioxide and hydrogen gas; and,
    a first helical tube disposed within the first shift reaction zone and in direct contact with the catalyst of the shift bed, the first helical tube having an inlet end communicating with an oxygen-containing gas supply source and an outlet end communicating with a fuel processing vessel.

2. The shift reactor of claim 1 wherein the shift reactor vessel has a central longitudinal axis, the first shift reaction zone has a first end and a second end, and the first helical tube includes a plurality of coiled sections, each coiled section being disposed in coaxial relation to the other coiled sections and to the central longitudinal axis, each coiled section also being disposed between the first and second ends of the first shift reaction zone, and in direct fluid communication with at least one other coiled section.

3. The shift reactor of claim 2 wherein the first helical tube is configured to permit the oxygen-containing gas to travel through each coiled section in a direction opposite to a direction traveled by the oxygen-containing gas through an adjacent coiled section.

4. The shift reactor of claim 1 wherein the first catalyst bed is a high temperature shift catalyst.

5. The shift reactor of claim 1 wherein the shift reactor vessel is annularly disposed about the fuel processing vessel.

6. The shift reactor of claim 1 wherein the fuel processing vessel has an inlet communicating with the outlet end of the first helical tube and configured to deliver the oxygen-containing gas tangentially into the fuel processing vessel.

7. The shift reactor of claim 1 wherein the fuel processing vessel includes a partial oxidation zone adapted to react a first reactant mixture including oxygen-containing gas from the first helical tube and hydrocarbon fuel.

8. The shift reactor of claim 7 wherein the fuel processing vessel further includes a steam reforming zone adapted to receive heat energy from the partial oxidation zone and to react a second reactant mixture including hydrocarbon fuel and water.

9. The shift reactor of claim 8 wherein the steam reforming zone is annularly disposed about the partial oxidation zone.

10. The shift reactor of claim 8 wherein the partial oxidation zone has a first end and a second end, an inlet proximate to the first end and communicating with the first helical tube, and an outlet proximate to the second end and communicating with the steam reforming zone, and wherein the steam reforming zone has an outlet communicating with the first shift reaction zone.

11. The shift reactor of claim 8 wherein the steam reforming zone includes a steam reforming catalyst suitable for catalyzing a steam reforming reaction.

12. The shift reactor of claim 11 wherein the steam reforming catalyst includes nickel.

13. The shift reactor of claim 7 wherein the steam reforming zone is adapted to receive reactants downstream from the partial oxidation zone.

14. The shift reactor of claim 1 further comprising a second helical tube disposed within the first shift reaction zone and having an inlet end communicating with a hydrocarbon fuel supply.

15. The shift reactor of claim 14 wherein:
the shift reactor vessel has a central longitudinal axis coincident with a first axis of symmetry of the first helical tube and coincident with a second axis of symmetry of the second helical tube;
the first shift reaction zone has a first end and a second end;
the first helical tube has a plurality of first coils and the second helical tube has a plurality of second coils;
each first coil is disposed in coaxial relation to the other first coils, is disposed between the first and second ends, and is in direct fluid communication with at least one other first coil;
the first helical tube is configured to permit the oxygen-containing gas flowing there through to travel through each first coil in a direction opposite to a direction traveled by the oxygen-containing gas through adjacent first coils;
each second coil is disposed in coaxial relation to the other second coils, is disposed between the first and second ends, and is in direct fluid communication with at least one other second coil; and,
the second helical tube is configured to permit the fuel flowing there through to travel through each second coil in a direction opposite to a direction traveled by the fuel through adjacent second coils.

16. The shift reactor of claim 14 further comprising:
a second shift reaction zone disposed in the shift reactor vessel downstream of the first shift reaction zone; and,
a third helical tube disposed within the second shift reaction zone and having an inlet end communicating with a water supply source.

17. The shift reactor of claim 16 wherein the second shift reaction zone includes a low-temperature shift catalyst.

18. The shift reactor of claim 16 further comprising an adiabatic shift reaction zone interposed between the first and second shift reaction zones.

19. The shift reactor of claim 16 further comprising:
a fuel processing vessel about which the shift reactor vessel is annularly disposed, the
fuel processing having a fuel processor inlet adapted to permit tangential delivery of reactants into the fuel processing; and,
an inlet conduit interconnecting the fuel processor inlet with an outlet of the first helical tube and an outlet of the second helical tube.

20. The shift reactor of claim 19 wherein:
the inlet end of the second helical tube is adapted to receive a mixture of fuel and water; the fuel processing vessel includes a steam reforming zone annularly disposed about a partial oxidation zone;
the partial oxidation zone is operably interposed between the inlet conduit and an inlet of the steam reforming zone; and,
the steam reforming zone communicates with the input side.

21. The shift reactor of claim 20 further comprising a circuit adapted to route steam generated in the third helical tube to the inlet end of the second helical tube.

22. The shift reactor of claim 20 further comprising a plenum interconnecting the steam reforming zone with the input side.

23. The shift reactor of claim 22 further comprising a steam inlet communicating with the plenum.

24. The shift reactor of claim 23 further comprising a circuit adapted to direct steam generated in the third helical tube to the inlet end of the second helical tube and to the steam inlet.

25. A shift reactor for subjecting carbon monoxide and water to a water-gas shift reaction to produce carbon dioxide and diatomic hydrogen comprising:
a shift reactor vessel having a first shift catalyst bed, an input zone for receiving reformate constituents including carbon monoxide and an outlet zone for discharging shift-reacted constituents including carbon dioxide and hydrogen gas; and,
a tube disposed within the shift reactor vessel and having an inlet end communicating with a source of unreformed hydrocarbon fuel, the tube situated within the shift reactor vessel to directly contact the catalyst of the first shift catalyst bed and permit transfer of heat energy from the shift-reacted constituents and catalyst to the unreformed hydrocarbon fuel.

26. The shift reactor of claim 25 further comprising an inlet conduit interconnecting the inlet end and the fuel supply source, and a water supply source communicating with the inlet conduit to permit water to mix with the fuel in the inlet conduit and flow with the fuel into the tube.

27. The shift reactor of claim 25 wherein the first catalyst bed disposed in the shift reactor vessel includes a high-temperature shift catalyst in contact with the tube.

28. The shift reactor of claim 25 wherein the tube is helical.

29. The shift reactor of claim 28 wherein:
the shift reactor vessel has a central longitudinal axis, a first end, and a second end;
the tube includes a plurality of coil sections;
each coil section is disposed in coaxial relation to the other coil sections and to the central longitudinal axis, each coil section extends between the first and second ends, and each coil section is in direct fluid communication with at least one other coil section; and,
the tube is configured to permit the unreformed hydrocarbon fuel to travel through each coil section in a direction opposite to a direction traveled by the fuel through adjacent coil sections.

30. A hydrocarbon fuel reformer for producing diatomic hydrogen gas comprising:
a first reforming reaction vessel containing a reforming catalyst bed;

a shift reactor vessel annularly disposed about the first reaction vessel and including a first shift reactor zone, the first shift reactor zone having a first shift catalyst bed, an input side for receiving reformats constituents including carbon monoxide and an outlet side for discharging shift-reacted constituents including carbon dioxide and hydrogen gas; and, a first helical tube disposed within the first shift reactor zone contacting the catalyst of the shift catalyst bed and having an inlet end communicating with a water supply source.

31. The reformer of claim 30 wherein the water supply source is adapted to supply liquid-phase water to the first helical tube at flow conditions sufficient to ensure discharge of liquid-phase and steam-phase water from an outlet end of the first helical tube.

32. The reformer of claim 30 wherein the first catalyst bed disposed in the first shift reactor zone includes a low-temperature shift catalyst in contact with the first helical tube.

33. The reformer of claim 30 wherein:
the shift reactor vessel has a central longitudinal axis;
the first shift reactor zone has a first end and a second end;
the first helical tube includes a plurality of coil sections; and,
each coil section is disposed in coaxial relation to the other coil sections and to the central longitudinal axis, each coil section extends between the first and second ends, and each coil section is in direct fluid communication with at least one other coil section.

34. A fuel processor for producing diatomic hydrogen gas comprising:
a vessel having a first end, a second end, and an outer wall;
a partial oxidation zone disposed in the vessel, extending between the first and second ends, and bounded by a first inner wall; and
a steam reforming zone interposed between the first inner wall and the outer wall, the first inner wall having a port disposed near the first end to define a first transition between a first flow path of reactants through the partial oxidation zone and a second flow path of reactants through the steam reforming zone in a direction substantially opposite the first flow path.

35. The fuel processor of claim 34 wherein the steam reforming zone is bounded between the first inner wall and a second inner wall, the fuel processor further comprising a shift reaction zone interposed between the second inner wall and the outer wall and operably communicating with the steam reforming zone.

36. The fuel processor of claim 35 wherein the steam reforming zone has a port disposed near the second end to define a second transition between the second flow path and a third flow path of reactants through the shift reaction zone in a direction substantially opposite the second flow.

37. The fuel processor of claim 35 wherein the second inner wall is permeable to permit a third flow of reactants through the shift reaction zone in directions substantially orthogonal to the first and second flows.

38. A reactor for producing hydrogen from hydrocarbons comprising:
a reforming reaction vessel containing a reforming catalyst;

a first shift reaction zone annularly disposed about the reforming reaction vessel, the shift reaction zone containing a first shift catalyst; and,
a boiler tube in the first shift reaction zone for carrying a heat transfer medium, the tube being located so as to permit heat transfer between a first portion of the tube and reaction constituents in the first shift reaction zone.

39. The reactor of claim 38, further comprising:
a second shift reaction zone containing a second shift catalyst; and,
the boiler tube being located so as to permit heat transfer between a second portion of the tube and reaction constituents in the second shift reaction zone.

40. The reactor of claim 39, wherein the second portion of the boiler tube being in contact with the second catalyst.

41. The reactor of claim 38, wherein the first portion of the boiler tube being in contact with the first catalyst.

42. The reactor of claim 41, wherein the second portion of the boiler tube being in contact with the second catalyst.

43. The reactor of claim 38, wherein the heat transfer medium is water and further comprising:
a water separator located outside the reaction vessel for separating water from steam generated in the boiler tube; and,
the boiler tube being operatively connected to the water separator.

44. The reactor of claim 38, further including a means to adjust a pressure in the tube so as to control the temperature of the heat transfer medium in the tube and thereby affect the temperature in the first shift reaction zone.

45. The reactor of claim 43, including a valve on the water separator to adjust a pressure in the boiler tube so as to control the temperature of the water, steam, or water/steam in the tube and thereby affect the temperature in the first shift reaction zone.

46. The reactor of claim 38, further comprising:
a fuel conduit for delivering a fuel stream to a portion of the reaction vessel for reaction;
a means for introducing steam from the boiler tube into the fuel stream from the fuel conduit so as to effect mixing of the steam with the fuel.

47. The reactor of claim 38, further comprising:
a fuel conduit for delivering a fuel stream to a portion of the reaction vessel for reaction;
a water separator located outside the reaction vessel for separating water from steam generated in the boiler tube, the boiler tube being operatively connected to the water separator;
a steam conduit directing steam from the water separator to a means for introducing steam from the water separator into the fuel stream so as to effect mixing of the steam with the fuel; and,
a chamber having an inner wall with an arcuate portion, the chamber being adapted to permit partial oxidation of hydrocarbons in the fuel and steam mixture, the chamber having an inlet which directs the fuel/steam mixture at a tangent to the arcuate portion of the inner wall of the chamber.

48. A reactor as in claim 38, including a mixing manifold for delivering fuel to the reaction vessel.

* * * * *